(12) United States Patent
Ionescu et al.

(10) Patent No.: US 7,501,479 B2
(45) Date of Patent: Mar. 10, 2009

(54) CATIONIC POLYMERIZATION OF BIOLOGICAL OILS WITH SUPERACID CATALYSTS

(75) Inventors: Mihail Ionescu, Pittsburg, KS (US); Zoran S. Petrovic, Pittsburg, KS (US)

(73) Assignee: Pittsburg State University, Pittsburg, KS (US)

( * ) Notice: Subject to any disclaimer, the term of this patent is extended or adjusted under 35 U.S.C. 154(b) by 99 days.

(21) Appl. No.: 11/800,736

(22) Filed: May 7, 2007

(65) Prior Publication Data

US 2008/0281071 A1 Nov. 13, 2008

(51) Int. Cl.
| C07C 57/03 | (2006.01) |
| C07C 57/12 | (2006.01) |
| C08F 2/02 | (2006.01) |
| C08F 4/12 | (2006.01) |
| C11B 3/02 | (2006.01) |
| C11C 3/00 | (2006.01) |

(52) U.S. Cl. ............. 526/238.3; 525/12; 525/16; 526/90; 526/134; 526/225; 526/321; 526/348.3; 527/100; 554/227; 554/163; 524/313

(58) Field of Classification Search ............. None
See application file for complete search history.

(56) References Cited

U.S. PATENT DOCUMENTS

| 2,160,572 A | 5/1939 | Eichwald |
| 2,365,919 A | 12/1944 | Uleth |
| 2,482,761 A | 9/1949 | Gloebel |
| 2,664,429 A | 12/1953 | Goebel |
| 2,793,219 A | 5/1957 | Barrett |
| 2,793,220 A | 5/1957 | Barrett |
| 2,955,121 A | 10/1960 | Myers |
| 3,157,681 A | 11/1964 | Fischer |
| 3,422,124 A | 1/1969 | Milks |
| 3,444,220 A | 5/1969 | Wheeler |
| 3,632,822 A | 1/1972 | Conroy |
| 4,937,320 A | 6/1990 | Vresswijk |
| 4,973,743 A | 11/1990 | Turner |
| 5,344,859 A * | 9/1994 | Eicken et al. ............... 523/501 |

(Continued)

FOREIGN PATENT DOCUMENTS

WO  WO 00/50528  8/2000

OTHER PUBLICATIONS

Croston, C.B. et al. Polymerization of Drying Oils. VI. Catalytic Polymerization of Fatty Acids and Esters with Boron Trifluoride and Hydrogen Fluoride. J. Am. Oil Chem. Soc. 1952, 29, 331-333.*

(Continued)

*Primary Examiner*—David R Sample
*Assistant Examiner*—Richard A Huhn
(74) *Attorney, Agent, or Firm*—Spencer Fane Britt & Browne LLP

(57) ABSTRACT

A method for the cationic polymerization of unsaturated biological oils (e.g., vegetable oils and animal oils) based on the cationic reaction of double bonds initiated by superacids is provided. The process occurs under very mild reaction conditions (about 70-110° C. and atmospheric pressure) and with short reaction times. The polymerized oils have a viscosity about 10 to 200 times higher than the initial oil and relatively high unsaturation (only about 10-30% lower than that of initial oils).

22 Claims, 20 Drawing Sheets

U.S. PATENT DOCUMENTS

| | | | |
|---|---|---|---|
| 5,399,729 A * | 3/1995 | Cooper et al. | 554/149 |
| 6,211,315 B1 * | 4/2001 | Larock et al. | 526/238.3 |
| 2002/0095007 A1 * | 7/2002 | Larock et al. | 524/310 |

OTHER PUBLICATIONS

Rajadhyaksha, R. A. et al. Super Acid Catalyzed Dimerization of Fatty Acids Derived From Safflower Oil and Dehydrated Castor Oil. J. Am. Oil Chem. Soc. 1988, 65, 793-797.*

Larock, R. C. et al. New Soybean Oil-Styrene-Divinylbenzene Thermosetting Copolymers. I. Synthesis and Characterization. J. Appl. Polym. Sci. 2001, 80, 658-670.*

Hernandez, R. et al. Cracking of oleic and acyl glycerides acid using a superacid or zeolites. The 234th ACS National Meeting, Boston, MA. Aug. 20, 2007.*

Chemical Forums: Chemistry Forum, Chemistry Question, Chemistry Help Articles, 1 page http://www.chemicalforum.com/index.php?op=Articles; article=20, Jan. 24, 2005.

* cited by examiner

CATIONIC POLYMERIZATION OF BIOLOGICAL OILS WITH SUPERACID CATALYSTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention is directed to a novel process for the direct cationic polymerization of biological oils, such as vegetable oils, to higher molecular weight products. Particularly, this invention relates to the cationic polymerization of biological oils, such as castor oil, corn oil, safflower oil, soybean oil, tung oil, and fish oil, and to copolymerization of these oils with other biological oils and/or other olefins. Polymerized biological oils can be used for preparation of polyols and other chemical species by introducing hydroxyl and other functional groups to ultimately produce elastomers, rubbers, and plastics from renewable resources.

2. Description of Related Art

The natural environment is being overwhelmed by non-biodegradable, petroleum-based polymeric materials. In recent years, there has been an interest in cheap, biodegradable polymeric materials made from readily available, inexpensive natural sources, such as fats and biological oils. See generally Larock, U.S. Pat. No. 6,211,315; U.S. Published Patent Application No. 2002/095007. The development of polymeric materials from biological oils, such as vegetable and fish oils, could dramatically expand and diversify the market for biological oils, while also improving the environment and reducing dependence on petroleum products.

Biological oils are triglycerides comprised of fatty acids. For example, soybean oil is comprised of three main unsaturated fatty acids: oleic acid, linoleic acid (also called linolic acid), and linolenic acid. The approximate composition of some common biological oils is set forth the following table. It will be appreciated that the composition may vary somewhat, depending on the source of the biological oil.

TABLE 1

Fatty Acid Content of Common Biological Oils

| Fatty Acid Profile | Canola oil | Mid-Oleic Sunflower oil | Soybean oil | Linseed oil | Sunflower oil | Corn oil |
|---|---|---|---|---|---|---|
| Lauric C12:0 | | | | 0.02 | | |
| Myristic C14:0 | 0.04 | 0.09 | 0.05 | 0.03 | 0.06 | |
| Myristoleic C14:1 | | | | | | |
| Palmitic C16:0 | 4.09 | 4.11 | 10.88 | 5.48 | 5.59 | 10.81 |
| Palmitoleic C16:1 | 0.21 | 0.05 | 0.07 | 0.06 | 0.06 | 0.11 |
| Heptadecanoic C17:0 | 0.05 | 0.04 | 0.09 | 0.05 | 0.05 | 0.09 |
| Heptadecanoic C17:1 | 0.09 | 0.04 | 0.04 | 0.04 | 0.01 | 0.03 |
| Stearic C18:0 | 1.86 | 3.79 | 4.18 | 3.52 | 4.46 | 1.85 |
| Oleic C18:1 | 56.11 | 57.15 | 22.69 | 18.88 | 22.18 | 27.25 |
| Linoleic C18:2 | 21.01 | 31.40 | 52.41 | 16.10 | 64.22 | 56.96 |
| Arachidic C20:0 | 0.60 | 0.25 | 0.26 | 0.12 | 0.24 | 0.30 |
| Eicosenoic C20:1 | 1.70 | 0.21 | 0.30 | 0.14 | 0.19 | 0.20 |
| Linolenic C18:3 | 7.89 | 0.31 | 6.06 | 53.73 | 0.42 | 0.65 |
| Heneicosanoic C21:0 | 0.01 | | 0.01 | | 0.02 | 0.02 |
| Eicosadienoic C20:2 | 0.06 | | 0.02 | | | |
| Behenic C22:0 | 0.17 | 0.46 | 0.14 | 0.04 | 0.41 | 0.03 |
| Erucic C22:1 | 0.12 | | | | | |
| Total C18:1 | 60.85 | 58.64 | 24.95 | 20.14 | 23.15 | 28.19 |
| Total C16:1, C20:1, C22:1, C24:1 | 2.08 | 0.26 | 0.37 | 0.20 | 0.25 | 0.31 |
| Total C18:2 | 21.33 | 31.79 | 52.72 | 16.21 | 64.80 | 57.52 |
| Total C20:2, C22:2 | 0.06 | 0.00 | 0.02 | 0.00 | 0.00 | 0.00 |
| Total C18:3 | 8.46 | 0.33 | 6.23 | 53.92 | 0.44 | 0.69 |
| Total C20:3 | 0.05 | 0.00 | 0.00 | 0.00 | 0.00 | 0.00 |
| Total Saturated Fatty Acids | 6.78 | 8.69 | 15.60 | 9.27 | 10.85 | 13.10 |

Currently, the polymerization of some unsaturated biological oils (linseed oil, soybean oil, sunflower oil, canola oil, etc.) is largely carried out on industrial scale by two routes: thermal polymerization process (heat bodied oils) and air blown oil process.

Thermal polymerization of biological oils is carried out by simple heating the oils, under nitrogen, at very high temperatures (usually about 290-330° C.) for several hours, in the absence of any catalyst or initiator. Due to the high temperature, thermal polymerization of the double bonds in the unsaturated fatty acids of the oils takes place. The resulting products are called bodied oils. They have much higher viscosity than the initial oil and lower iodine value (a lower double bond content) as compared with the initial oil. Typically, the iodine value is about 65 for bodied soybean oil, and about 100 for bodied linseed oil. This process is applied industrially, especially for linseed oil. Unfortunately, the process has a high energy consumption due to the high temperatures needed. In addition, the thermal polymerization process takes a relatively long time, and the thermal degradation of the oil results in the formation of volatile low molecular weight compounds which are eliminated continuously by steam stripping under vacuum. The yield in final thermally polymerized oil is about 80-85% against the quantity of initial oils.

Air blown oils are obtained by bubbling air through the liquid biological oils (linseed oil, soybean oil, sunflower oil, castor oil, etc.) in the presence or in the absence of radical initiators, at about 100-110° C., for a relatively long time (30-50 hours). The viscosity of oil increases substantially, probably due to radical polymerization involving oxidative coupling through the allylic hydrogens and the double bonds of the unsaturated fatty acids in the oils. As a result, the iodine value of the air blown oil is much lower than the initial iodine value of the oil (e.g., about 80 for air blown soybean oil). In addition, an oxidative-degradative process of the oil takes place, resulting in the formation of various functional groups containing oxygen, such as aldehydes, ketones, hydroxyl, carboxyl, hydroperoxide, etc. The average molecular weight of the air blown oil is also relatively low, with the maximum being about 1300-1400 g/mol.

It also is known to cationically polymerize fatty acids (or their esters, mainly methyl esters) to obtain dimeric acids and trimeric acids in the presence of cationic catalysts. The majority of industrial processes used to synthesize dimeric and trimeric acids employ acidic activated clays (activated bentonites from the group of montmorillonite which is an acidic aluminium silicate, or magnesium silicate, 3-5% against oil) as catalysts in the presence of water at high temperatures (230-240° C.) over several hours (4 to 7 hours). The catalyst is filtered and reused, and the unreacted fatty acids are distilled, leaving behind about 50-60% dimer ($C_{36}$) and trimer fatty acids ($C_{54}$). Concerning the cationic polymerization of fatty acids with acidic clays, there is a large number of patents, such as Goebel, U.S. Pat. No. 2,482,761; Goebel, U.S. Pat. No. 2,664,429; Barrett et al., U.S. Pat. No. 2,793,219; Barrett et al., U.S. Pat. No. 2,793,220; Myers et al., U.S. Pat. No. 2,955,121; Fischer, U.S. Pat. No. 3,157,681; Conroy, U.S. Pat. No. 3,632,822; Milks et al., U.S. Pat. No. 3,422,124; Wheeler, U.S. Pat. No. 3,444,220; Turner et al., U.S. Pat. No. 4,937,320; Bermann, GB1353783; Hayes, GB2172597; and DiFranco, WO 00/50528.

For the polymerization of fatty acids and of methyl esters of fatty acids, there are some processes that use Lewis acids as catalysts, mainly boron trifluoride ($BF_3$) or boron trifluoride diethyl etherate ($BF_3*Et_2O$). More specifically, Turner et al., U.S. Pat. No. 4,973,743 describes a process in which methyl soyate was polymerized at 20-25° C. in the presence of $BF_3$ over three hours. The resulting polymeric product contained 25-33% monomer, 18-22% dimer, and 49-53% trimer and higher polymers. The polymerization of fatty acids and fatty acids esters with strong Lewis acids is also described in the scientific literature. See Croston et al., *Polymerization of Drying Oils: Catalytic Polymerization of Fatty Acids and Esters with Boron Trifluoride and Hydrogen Fluoride*, Journal American Oil Chemists Society, 331-333 (1952). Those researchers used 2% $BF_3$ as a catalyst at 150-200° C. Ghodssi et al., *Cationic Polymerization of Oleic Acid and its Derivatives. Study of Dimers*, Bulletin de la Societe Chimique de France, 4 1461-1466 (1970) describes the cationic polymerization of methyl oleate at 20-30° C. with the formation of dimers and higher oligomers.

The cationic polymerization of biological oils by using boron trifluoride ($BF_3$) as the catalyst is described in two patents. In Uloth et al., U.S. Pat. No. 2,365,919, soybean oil was polymerized at 130° C. in the presence of 2.8% $BF_3$ as catalyst. A viscous product was obtained, with viscosity about five times higher than the initial viscosity of soybean oil. Under similar conditions, cottonseed oil was polymerized over six hours at 130° C. in the presence of 4% $BF_3$ as catalyst. A polymerized product was obtained with a viscosity of about 10 times higher than the initial viscosity of oil. In Eichwald, U.S. Pat. No. 2,160,572, soybean oil was polymerized at 70° C. with 2% boron trifluoride over 50 hours. Another group lead by Professor Richard Larock has investigated the cationic copolymerization of natural oils (soybean oil, fish oil, tung oil, etc.) with some vinyl monomers, including styrene, divinyl benzene, norbornene, dicyclopentadiene, in the presence of $BF_3.Et_2O$ (4-5%). Polymerization results in solid copolymers as generally set forth in Larock et al., U.S. Pat. No. 6,211,315 and Larock et al., U.S. Published Patent Application 2002/095007.

The present invention is directed to an improved process for the cationic polymerization of biological oils. In contrast to the use of the Lewis acid boron trifluoride ($BF_3$) as the catalyst, the present invention employs a superacid as the catalyst, with tetrafluoroboric acid ($HBF_4$), triflic acid ($CF_3SO_3H$), and hexafluoroantimonic acid ($HSbF_6$) being especially preferred. The present invention provides superior and unexpected results, including short reaction times, much higher viscosity of the products, and milder reaction conditions. The biological oils are polymerized to higher molecular weight products consisting of monomers, dimers, trimers, tetramers, higher oligomers and polymers.

BRIEF SUMMARY OF THE INVENTION

The present invention is directed to a novel process for the cationic polymerization of biological oils. The process comprises obtaining a biological oil containing an unsaturated fatty acid ester; mixing the biological oil with a superacid catalyst to form an oil-catalyst reaction mixture; and maintaining the oil-catalyst reaction mixture for a reaction period sufficient to form a polymerized biological oil.

The present invention is also directed to reaction mixtures comprising one or more biological oils with a superacid catalyst. In another aspect, the present invention is directed to a reaction mixture consisting essentially of one or more biological oils and a superacid catalyst such that other olefinic reactants are omitted from the reaction mixture.

In the present invention, it was surprising discovered that by using anhydrous very strong superacids as catalysts, the cationic polymerization of unsaturated natural oils occurs with a very high efficiency under very mild reaction conditions.

In one aspect, the polymerization process of the present invention employs a superacid catalyst with high activity and efficiency. The superacid catalysts (e.g., $HBF_4$, $CF_3SO_3H$, and $HSbF_6$) have a very high catalytic efficiency, much higher than the Lewis acid $BF_3$. The superacid catalyst concentration used preferably ranges between about 0.1 to 5 wt. % (more preferably, about 0.5 to 2 wt. %) of the reaction mixture, with about 1 wt. % being most preferred.

In still another aspect, the superacid catalysts may be characterized as having a $pK_a$ greater than sulfuric acid, e.g., a $pK_a$ of about −3, −4, −5, −6, −7, −8, −9, −10, −11, −12, −13, −14, −15, −16, −17, −18, −19, −20, −21, −22, −23, −25, or −25 or less.

In another aspect, the cationic polymerization process occurs at relatively low polymerization temperatures, e.g., less than about 110° C., 100° C., 95° C., 90° C., or 85° C. In another aspect, the reaction temperature ranges from about 60 to 110° C., more preferably from about 80 to 100° C. Thus, at such low temperatures, the polymerization process has a low energy consumption.

In a preferred aspect the cationic polymerization process occurs by maintaining the oil-catalyst reaction mixture at or near room temperature (e.g. about 20 to 35° C.) for about 20 to 120 minutes (more preferably 40 to 60 minutes), and then heating the reaction mixture to about 80 to 110° C. for about 3 to 10 hours (more preferably about 4-7 hours).

In still another aspect, the present invention is directed to a polymerization process which has a relatively short reaction time. The reaction time is typically about 4 to 10 hours, more preferably about 3 to 5 hours, but may be adjusted depending on the desired viscosity of the polymerization reaction product.

In still another aspect, the present invention is directed to a polymerization process which has a high yield in the final product, practically quantitative such that little or no oil is lost due to gaseous degradation products. In the thermal polymerization of oils, due to the degradative reactions, about 15-20% from the initial oil is lost by formation of volatile organic compounds (hydrocarbons, alkenes, aromatics, acrolein, etc.).

In yet a further aspect, the present invention may be used to form homopolymers of biological oils or copolymers of two or more biological oils. In an exemplary embodiment, novel reaction products of copolymerized oils are produced. The process can be applied successfully to all unsaturated biological oils, including but not limited to soybean oil, sunflower oil, corn oil, linseed oil, fish oil, and canola oil. For example, copolymers of linseed oil with other biological oils such as sunflower oil/linseed oil, soybean oil/linseed oil, corn oil/linseed oil, etc., may be produced. Each biological oil is considered as a polyfunctional monomer.

In still yet another aspect, the novel reaction products of the polymerized oils are well defined structures that consist only of triglycerides with hydrocarbon chains and ester groups, without oxidative functional groups such as hydroperoxides, aldehydes, ketones, or hydroxyls, which are part of the structure of air blown oils.

In a further aspect, the polymerization process of the present invention forms a reaction product which is a viscous liquid, with a viscosity of about 10, 20, 30, 40, 50, 60, 70, 80, 100, 120, 150, 175, or even 200 or more times higher than those of the initial unpolymerized biological oils. Typically, the polymerized biological oil has a viscosity which is at 10 to 40 times greater that the starting material.

In still another aspect, the polymerization process of the present invention forms a reaction product which has a polymer content greater than about 40%, 50%, 60%, 70%, 80%, or 90%, with the remainder of the composition comprising unreacted monomers.

In still another aspect, the polymerized reaction product comprises a viscous liquid having a relatively high degree of unsaturation. The iodine valves are preferably only about 10%, 20%, 30%, 40%, or 50% lower than the starting material. In another aspect, the iodine values are only about 10-30% lower than that of the unpolymerized starting material. For example, a polymerized soybean oil prepared by the cationic process of the present invention has an iodine value (I.V.) of 100 to 110 g $I_2$/100 g. The initial I.V. of the soybean oil before cationic polymerization was about 131 g $I_2$/100g.

In another aspect, the acid value of cationic polymerized oils is relatively low. Typically, the acid value is about 2-3 mg KOH/g, much lower than those of bodied oils (9-18 mg KOH/g) or blown oils (8-10 mg KOH/g).

In another aspect, the cationic polymerization process may be carried out to produce solid oils, meltable upon heating, which can be used as processing aids in rubber industry (replacement for factice, for example).

The resulting polymeric biological products are also suitable raw materials for inks, or for functionalized biological oil polymers especially for polyols for polyurethanes. They can be also used for new epoxy resins, or in the form of polyaldehydes and polyacids, as building blocks for new polymers, etc.

Since the number of double bonds consumed in the polymerization process is relatively low, the resulting products are well adapted for use as raw materials in the preparation of air drying lacquers, varnishes, coatings, paints, and inks. In particular, the resulting polymerized oils have a high concentration of double bonds available for subsequent cross-linking reactions and oxidative coupling and at the same relatively time high viscosity. The resulting products may serve as a base for polymeric epoxy, hydroxyl, carbonyl, carboxyl, amino, aldehyde, etc., compounds. These compounds are excellent building blocks for new polymers (polyurethanes, polyesters, polyamides, etc.) and for other applications.

In another aspect, a proposed mechanism is provided for the polymerization process. The mechanism generally involving pericyclic reactions of "ene"-reaction and Diels-Alder reaction involving diene addition to double bond.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The present invention is directed to a novel method for polymerizing biological oils. The method comprises the steps of obtaining at least one biological oil containing an unsaturated fatty acid ester; mixing the biological oil with a superacid catalyst to form an oil-catalyst reaction mixture; and maintaining the oil-catalyst reaction mixture at a temperature less than about 110° C. for a reaction period to form a polymerized biological oil. In a preferred aspect, the biological oil-catalyst reaction mixture is maintained at about 20 to 35° C. for about 20 to 120 minutes, and is then heated to about 80 to 110° C. for about 3 to 10 hours. The reaction mixture may optionally contain other olefinic comonomers; however, reaction mixtures consisting essentially of biological oils as the reactants are most preferred.

Figure 1:
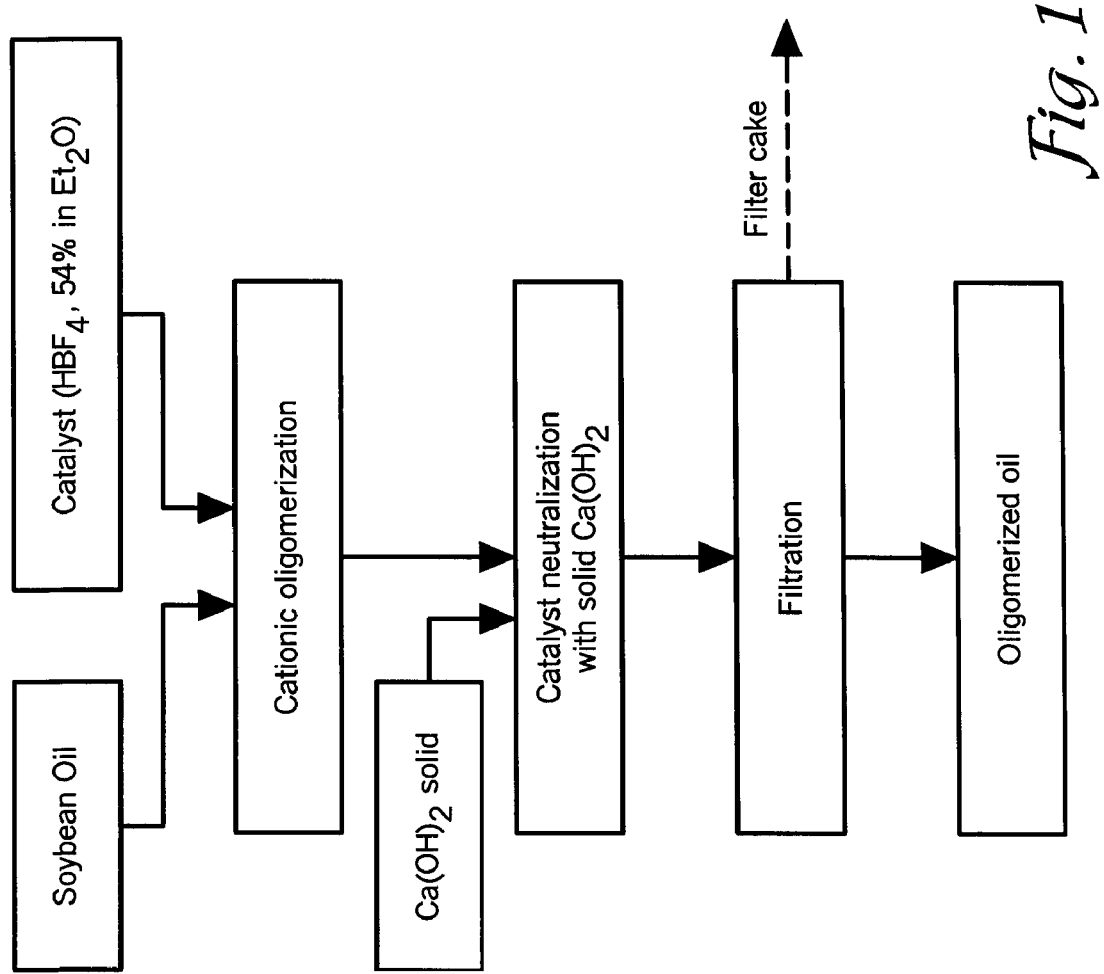
FIG. 1 is a schematic flow diagram illustrating the preparation of a polymerized oil in accordance with an exemplary embodiment of the present invention. A superacid catalyst (e.g., 54 wt. % $HBF_4$ in diethylether) is mixed with a biological oil (e.g., soybean oil) to form a cationic polymerization reaction mixture. After polymerization, the superacid catalyst is neutralized with a suitable base (e.g., calcium hydroxide), and filtered to form the pure polymerized product.

More specifically, the polymerization scheme is generally shown in FIG. 1. In an exemplary aspect, very strong acidic catalysts (superacids), such as tetrafluoroboric acid ($HBF_4$), were mixed in relatively low concentrations (1-2 wt. % against the oil) with unsaturated biological oils (preferably vegetable oils) to polymerize the biological oils to higher molecular weight compounds (dimers, trimers, tetramers, oligomers, etc.). The cationic polymerizing reactions occur at relatively moderate temperatures of about 70-100° C. (preferred temperatures of about 80-90° C.) in relatively short reaction periods (preferably about 3-5 hours) in an inert atmosphere (e.g., nitrogen). The superacid catalyst can be neutralized with a suitable base (e.g., calcium hydroxide or sodium bicarbonate), and the polymerized oil may be purified using a suitable separation step (e.g., filtration). The cationic polymerization process of the present invention is applicable to all unsaturated biological oils.

Virtually any biological oil can be used as a reactant in the process of the present invention. The biological oils are of the type described herein typically are composed of triglycerides of fatty acids. These fatty acids may be either saturated, monounsaturated, or polyunsaturated and contain varying chain lengths typically ranging from $C_{12}$ to $C_{24}$. The most common fatty acids include saturated fatty acids such as lauric acid (dodecanoic acid), myristic acid (tetradecanoic acid), palmitic acid (hexadecanoic acid), steric acid (octadecanoic acid), arachidic acid (eicosanoic acid), and lignoceric acid (tetracosanoic acid); unsaturated acids include such fatty acids as palmitoleic (a $C_{16}$ acid), oleic acid (a $C_{18}$ acid); polyunsaturated acids include such fatty acids as linoleic acid (a di-unsaturated $C_{18}$ acid), linolenic acid (a tri-unsaturated $C_{18}$ acid), and arachidonic acid (a tetra-unsubstituted $C_{20}$ acid). The triglyceride biological oils are comprised of esters of these fatty acids in random placement onto the three sites of the trifunctional glycerine molecule.

It will be appreciated that different vegetable oils will have different ratios of these fatty acids and within a given vegetable oil there is a range of these acids as well depending on such factors as where the vegetable or crop is grown, maturity of the vegetable or crop, the weather during the growing season, etc. Similarly, there are variations in animal oils. Because of this, it is difficult to have a specific or unique structure for any given biological oil, but rather a structure is typically based on some statistical average. Thus, the values provided in Table 1 are exemplary only, and may vary from those provided. One method of quantifying the number of double bonds is the I.V. which is defined as the number of grams of iodine that will react with 100 grams of vegetable oil. For example, for soybean oil, typical I.V. ranges from about 120-140 g $I_2$/100 g.

"Biological oil" as used herein shall be understood to mean an oil of animal or vegetable origin, which contains one or more unsaturated fatty acid esters, and excludes oils of a mineral origin, such as petroleum. Examples of suitable vegetable oils include, but are not limited to, calendula corn, canola, cicinum, coconut, cotton seed, flax, linseed, mustard seed, olive, oiticica, palm, perilla, peanut, poppy seed, tsubaki, tung, rapeseed, safflower, sesame, soybean, sunflower, and walnut oils. Vegetable oils typically contain about 3 to 7 double bonds/molecule, depending on the type and concentration of fatty acids. Animal oils include fish oil, neat's-foot oil, sperm oil, whale oil, tallow fat, or lard.

The biological oil starting material may be used in an unprocessed (crude) state, or may be processed either commercially or in the laboratory. Commercially processed oils sold under the WESSON, CRISCO, and NEW HORIZON brand names are all suitable for carrying out the process of the invention. Fish oil sources include, for example, Norway fish oil, as supplied by Pronova Biocare (Bergen, Norway) and Capelin fish oil, as supplied by SR-Mjol HF (Reykjavik, Iceland).

As discussed more fully below, in the absence of a comonomer, according to the inventive polymerization scheme, the presence of two or more double bonds in fatty acids is required for the reaction to proceed easily. Thus, biological oils having relatively high content of linoleic and linolenic acid generally polymerize more readily that those with relatively high content of oleic acid. In the examples below, the highest viscosity of polymerized biological oils of those tested is obtained with linseed oil and soybean oil which have the highest content in linolenic acid. Oils having a lower content in linolenic acid, but an appreciable amount of linoleic acid yield polymerized oils with a lower viscosity (e.g., sunflower oil, corn oil, canola oil, safflower oil), indicating a lower degree of polymerization. Oils with a high content of oleic acid (e.g., high oleic safflower oil) lead to extremely low viscosities and polymerization degree. Oils with a conjugated double bond such as tung oil (having in the triglyceride structure alpha eleostearic acid, with a conjugated triene structure) reacts violently to a solid polymer in several minutes. A highly unsaturated oil, fish oil, is also a suitable monomer for cationic polymerization.

As used herein, the term "superacid" is used herein in its conventional sense, that is to say an acid with a $pK_a$ less than that of 100% sulfuric acid ($H_2SO_4$) which has a $pK_a$ of about −3. Thus, the superacids used in the present invention may, for example, have a $pK_a$ of about −3, −4, −5, −6, −7, −8, −9, −10, −11, −12, −13, −14, −15, −16, −17, −18, −19, −20, −21, −22, −23, −25, or −25 or less. The preferred superacids are those which are $10^5$ to $10^{25}$ times, more preferably $10^{12}$ to $10^{18}$ times stronger than sulfuric acid. The most preferred superacids include tetrafluoroboric acid ($HBF_4$; $pK_a$ of about −15), triflic acid (trifluoromethane sulfonic acid, or $CF_3SO_3H$; $pK_a$ of about −15), and hexafluoroantimonic acid ($HSbF_6$; $pK_a$ of about −25). Other suitable superacids include, but are not limited to, hexafluorophosphoric acid ($HPF_6$), hexafluoroarsenic acid ($HAsF_6$), hexafluorotantalum acid ($HTaF_6$), hexafluoroniobium acid ($HNbF_6$), $HCB_{10}C_{11}$, and anhydrous hydrofluoric acid (HF). It will be appreciated to those skilled in the art that superacids generally may be formed by dissolving a powerful Lewis acid (e.g., $SbF_5$) with a Bronsted acid (e.g., HF or $HSO_3F$). For example, "magic acid" is generally prepared by mixing antimony pentafluoride ($SbF_5$) and fluorosulfuric acid ($HFSO_3$). Other suitable superacids include combinations between triflic acid with other Lewis acids, such as $AsF_5$, $TaF_5$, and $NbF_5$. Still other superacid examples include combinations of Bronsted-Lewis acids, such as $CF_3SO_3H$—$SbF_5$, $CF_3SO_3H$—$BF_3$, and $CF_3SO_3H$—$PF_5$. In another aspect, the superacids has the general formula $CF_3$—$(CF_2)_x$—$SO_3H$, wherein x is an integer between 1-20.

Further, suitable superacid precursors, for example diazonium, phosphonium, sulfonium, and iodonium compounds, may be used in this invention, but iodonium compounds are preferred.

As a general rule, the biological oils are polymerized only with superacids in pure form or in nonprotic media (solution in ethers being most preferred), in the absence of hydrogen active compounds (water, alcohols, carboxylic acids, etc.). For example, tetrafluoroboric acid ($HBF_4$) is preferably in a diethyl ether solution. It was found that the superacids in aqueous solution ($HBF_4$, $HPF_6$, $CF_3SO_3H$) are inactive in polymerization because water is a strong inhibitor of cationic polymerization, destroys the carbocations, and leads to ester bond splitting. Thus, aqueous solutions or alcoholic solutions of superacids, regardless of the acid strength, are not employed.

As used herein, "polymeric biological oil" or "polymerized biological oil" refers to a compound that has at least two triglyceride-based monomer units present. The term includes dimers, trimers, tetramers, and higher oligomeric products.

Two or more biological oils may be copolymerized by the process of the present invention. In a preferred aspect, at least one of the biological oils has a linolenic acid content of greater than 20%, 30%, 40%, or 50% linolenic acid. Exemplary mixtures include 80% soybean oil and 20% linseed oil; 80% sunflower oil and 20% linseed oil; 80% corn oil and 20% linseed oil; 80% canola oil and 20% linseed oil; 90% soybean oil and 10% tung oil. Copolymerization of biological oils may be used to obtain a higher degree of polymerization from oils with a low content in linolenic acid. For example, copolymerization between sunflower oil (80-90%) and linseed oil (10-20%) led to polymerized oils with a much high viscosity than those obtained from sunflower oil only. In a similar manner, copolymers from corn oil with linseed oil, canola oil with linseed oil, and safflower oil with linseed oil, lead to highly viscous products with a high degree of polymerization.

The biological oils of the present invention may also be copolymerized with other suitable olefin monomers. The olefinic comonomers may be provided in any desired amount, although 5 to 35 wt. % is preferred, depending on the particular comonomers and also depending upon the starting biological oil. If the biological oil is conjugated or metathesized, useful plastics may be obtained with no or very minimal amounts of olefin comonomers.

Exemplary olefin comonomers include acyclic alkenes, as well as cyclic alkenes, including diallyl phthalate, dicyclopentadiene, and norbornadiene. Other comonomers include, for example, isobutylene, p-methoxy-styrene, vinyl toluene, vinyl naphthalene, ethyl vinyl ether, iso-butyl vinyl ether, triethylene glycol divinyl ether, diethylene glycol divinyl ether, butylene glycol divinyl ether, isopropyl vinyl ether, vinyl carbazole, styrene, divinylbenzene, diisopropenylbenzene, norbornene, dicyclopentadiene, alpha-methylstyrene, isoprene, myrcene, 1,1-dichloroethene, linalool, cyclopentadiene, 1,3-di-(2-propenyl)benzene, dipentene, 1,1-diphenylethene, 2,5-dimethylhexa-2,5-diene, ethyl-2-carboethoxy-3-methyl-2-butenoate, ethylvinyl ether, 4-vinyl cyclohexene, diallyl terephthalate, furan, p-benzoquinone, and p-mentha-1,8-diene. The preferred comonomers include divinylbenzene, norbornadiene, styrene, alpha-methylstyrene, p-mentha-1,8-diene, and furan.

Although not intended to be limited by the mechanism, it is theorized that the polymerization occurs by a complex of set of reactions of allyl cations formed during reaction, with the double bonds of oils, which by pericyclic reactions ("ene" reaction, Diels Alder reaction etc.) link the triglyceride units with sigma bonds to dimers, trimers, tetramers, higher oligomers, and polymers. That is, cationic polymerization of oils seems to be a complex of several cationic reactions: proton addition to double bonds, hydride ion transfer, rearrangement reactions, pericyclic reactions ("ene" reactions and Diels Alder reactions), while the classical cationic polymerization mechanism plays probably a minor role.

The reaction, which probably plays the most important role in the cationic polymerization of unsaturated oils is the "ene" reaction (Alder-ene reaction), is a pericyclic reaction between an olefin having allylic position and an olefin ("enophile") with low electron density at the double bond. As a consequence of the "ene" reaction, a new sigma bond is formed, one double bond migrates, one allylic hydrogen is transferred, and one double bond disappears: The general Alder-ene reaction is presented below:

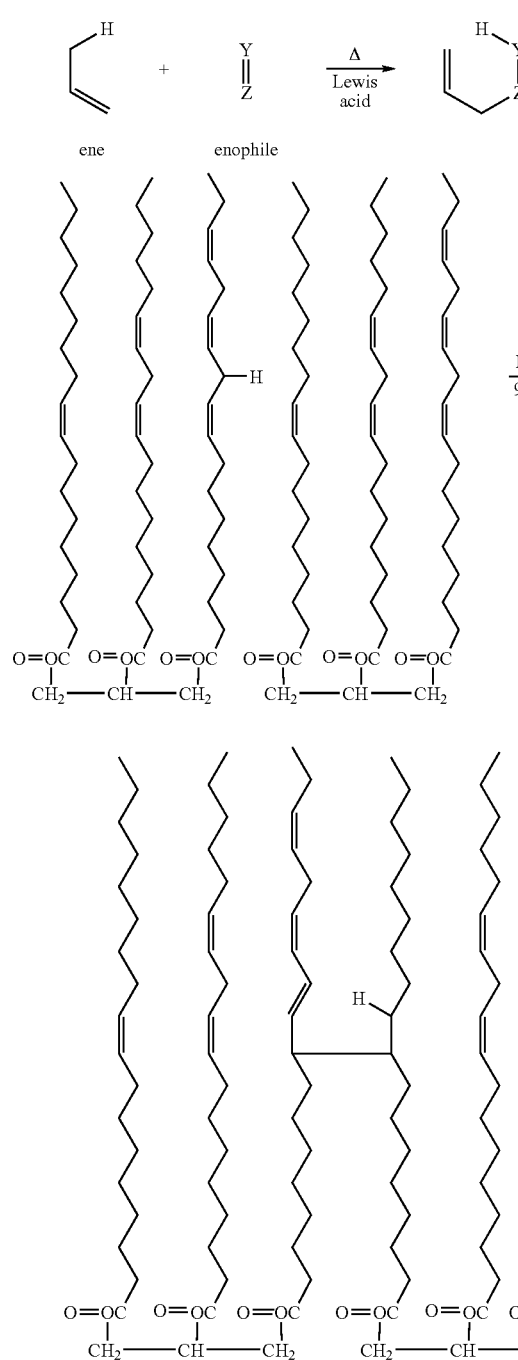

The linkage between two soybean oil molecules involving Diels Alder reaction is presented below:

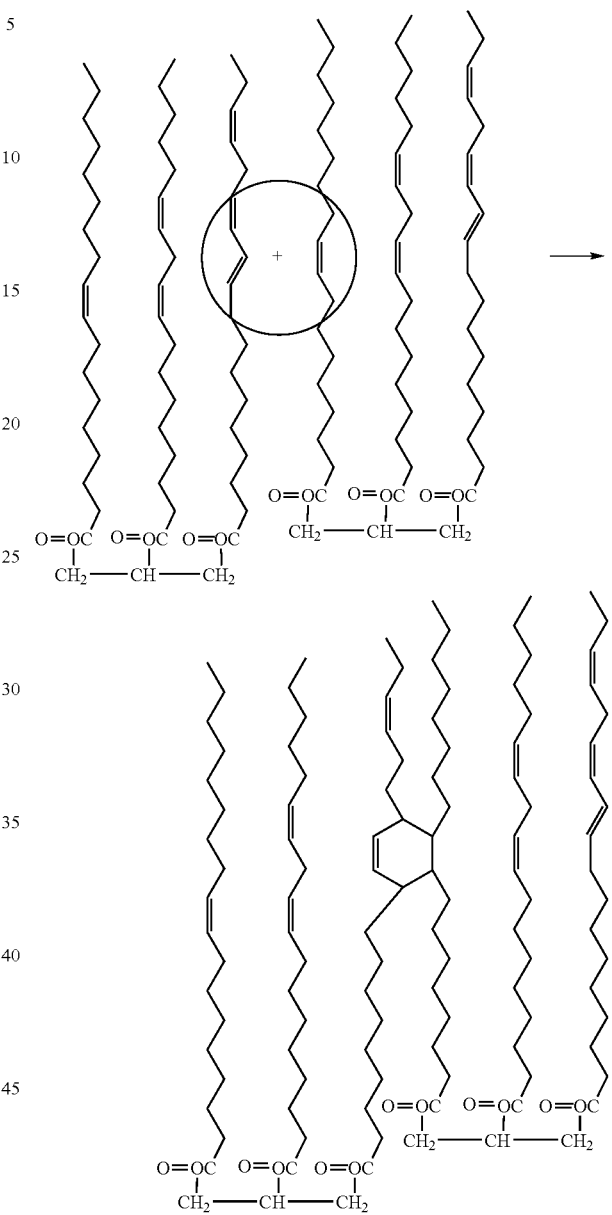

The classical mechanism of cationic polymerization generally does not apply due to the very low reactivity of internal double bonds having allylic positions.

Allyl structures are powerful transfer agents in cationic polymerization, being transformed in allyl cations, which are extremely stable and of lower reactivity. The strongest transfer agents are bis-allylic structures, such as the methylene groups between double bonds in linoleic and linolenic acids.

EXPERIMENTAL

Polymerization Overview.

In the following examples, the following procedure was used unless otherwise specified. A glass reactor was charged with a biological oil or a mixture of biological oils and the air was eliminated by continuous bubbling of nitrogen in the reaction mass for about 20-30 minutes. Then, the superacid catalyst was added at a concentration of about 1% (w/w, calculated as a pure substance) against the oil at room temperature, under continuous stirring. The biological oil and the catalyst were stirred for about 40-60 minutes at room temperature. After about 15-20 minute from the moment of catalyst addition, the color of the reaction mass turns dark brown, indicating the formation of the cationic active centers. The reaction mass was then heated to about 90° C. and maintained at this temperature for about 5-6 hours, or until the desired viscosity was obtained. The acid catalyst was neutralized by adding about 3% of solid base (e.g., $Ca(OH)_2$ or $NaHCO_3$) at about 50-60° C., within about 1-2 hours under constant stirring. After about 15-20 minutes, the color of the reaction mass changed from dark brown to yellow, indicating the decomposition of cationic active centers and neutralization of the acid catalyst. The reaction mass was filtered under pressure (at about 40 psi) and the traces of volatile compounds were removed by vacuum distillation at about 1-2 mmHg and 100-110° C., in a rotary evaporator. The final polymerized oil had an orange to light brown color, and had about 20 to 200 times higher viscosity than the initial oil.

EXAMPLE 1

Polymerization of Soybean Oil

Soybean oil is one of the most important vegetable oils, representing about 25% from the total oils produced worldwide. The high unsaturation (I.V. about 125-132 g $I_2$/100 g) and the presence in the structure of about 22-25% oleic acid (one double bond), about 52-55% linoleic acid (two double bonds) and about 6-7% linolenic acid (three double bonds) provide a good capacity for polymerization.

In this example, a 1 L glass reactor was charged with about 500-600 g of standard soybean oil (IV=125-131 g $I_2$/100 g of oil) and about 9.5 ml of 54% solution of $HBF_4$ in diethylether (1% of pure $HBF_4$). The oil/catalyst mixture was stirred at room temperature for about 40-60 minutes under a protective atmosphere by bubbling nitrogen through the reaction mixture. In this interval of time, the color of the soybean oil changed from yellow to dark brown due to the formation of cationic active centers, probably conjugated allyl cations. Within about 20-30 minutes temperature increased to about 90° C., and was then maintained at about 88-92° C. for about five hours. In the first three hours, the viscosity of the reaction mass increases slowly, but after about three hours, a marked increase of viscosity occurred. After about five hours of cationic polymerization, the viscosity rose to 8-10 Pa·s at 25° C. The reaction was stopped and polymerized oil containing the acid catalyst was purified. The purification step, i.e., the removal of the acidic catalyst involved treating the polymerized oil with solid $Ca(OH)_2$ powder (3% against the polymerized oil) for one hour at about 50-60° C. The color of the oil changed after about 10-15 minutes of contact with solid $Ca(OH)_2$ from dark brown to yellow. The color change indicated the destruction of cationic active centers and the neutralization of the acid catalyst. The reaction mass was then filtered under pressure (about 40 psi) at about 60-70° C. The purified oil collected was a light orange viscous liquid. The polymerized oil was then maintained under vacuum of about 1-2 mm Hg at about 100-110° C. for about 20-30 minutes in a rotary evaporator for the elimination of diethylether from the catalyst solution and the small quantity of water resulting from neutralization.

The final purified oil was a transparent light orange liquid, having viscosity between 8-10 Pa·s at 25° C. (about 130-160 times higher than those of the initial unpolymerized soybean oil), a high content in oligomers (about 70-72%), and an acid number of about 1.5-3 mg KOH/g. The number average molecular weight ($M_n$) was in the range of 1800-2100, the weight average molecular weight ($M_w$) was about 20,000-30,000, and the Mw/Mn was about 11-15, indicating a broad molecular weight distribution.

The molecular weight of the polymerized soybean product determined by Vapor Pressure Osmometry, after about five hours of reaction was about 1760. The reaction product is a mixture of many molecular species: monomers (MW=870), dimers (MW=1740), trimers (MW2600), tetramers (MW=3480), and higher oligomers with MW less than 4000. The results are shown in FIG. 3.

Figure 2A:
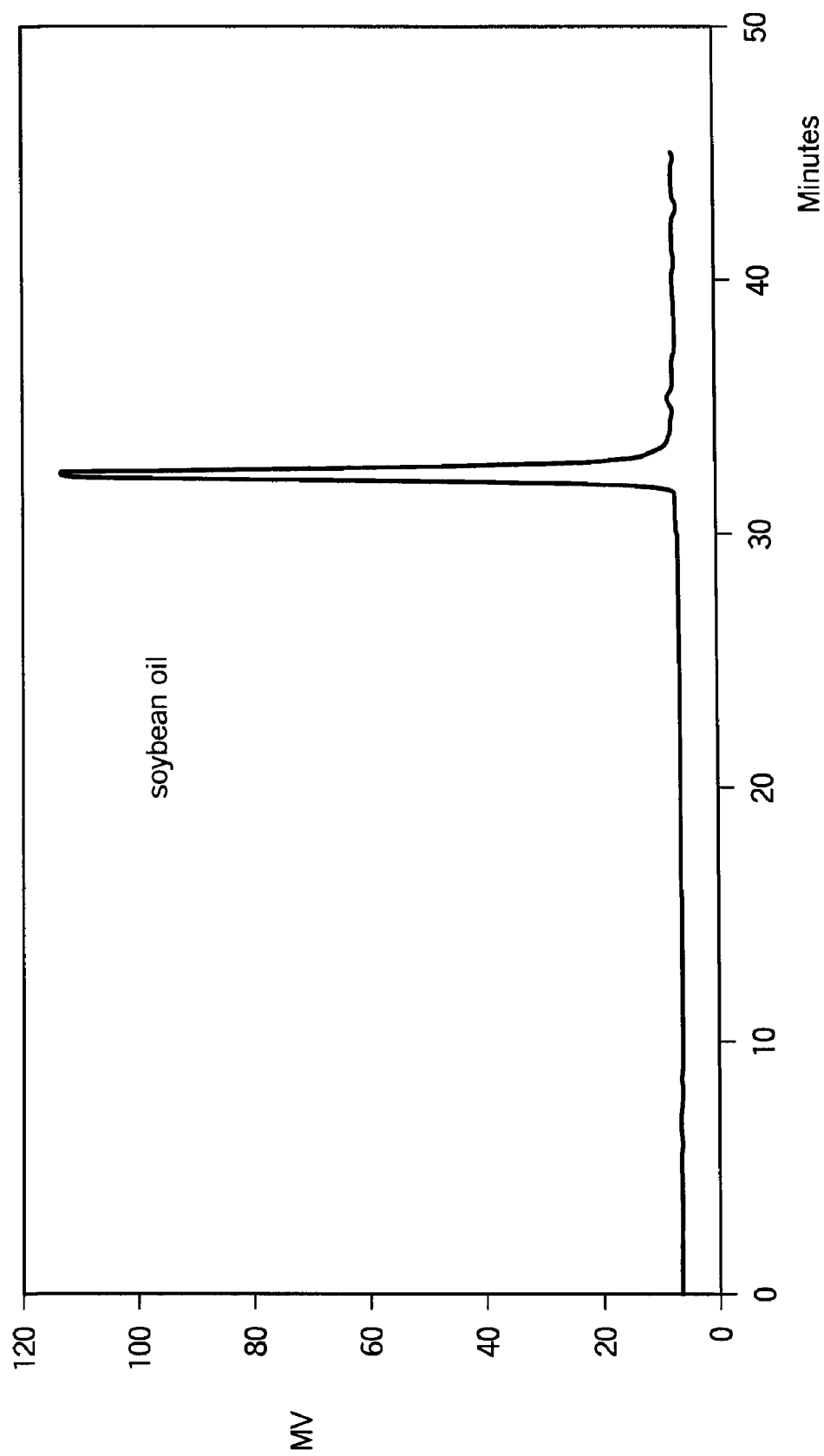
FIG. 2 is a gel permeation chromatogram ("GPC") of soybean oil before (FIG. 2A) and after (FIG. 2B) about five hours of cationic polymerization in accordance with the present invention. GPC is also known as size exclusion chromatography or gel filtration chromatography. In general, GPC separates polymer molecules on the basis of their size as separated by pores in the column packing material. The primary use of GPC is in measuring molecular weight and molecular weight distributions.
Figure 2B:
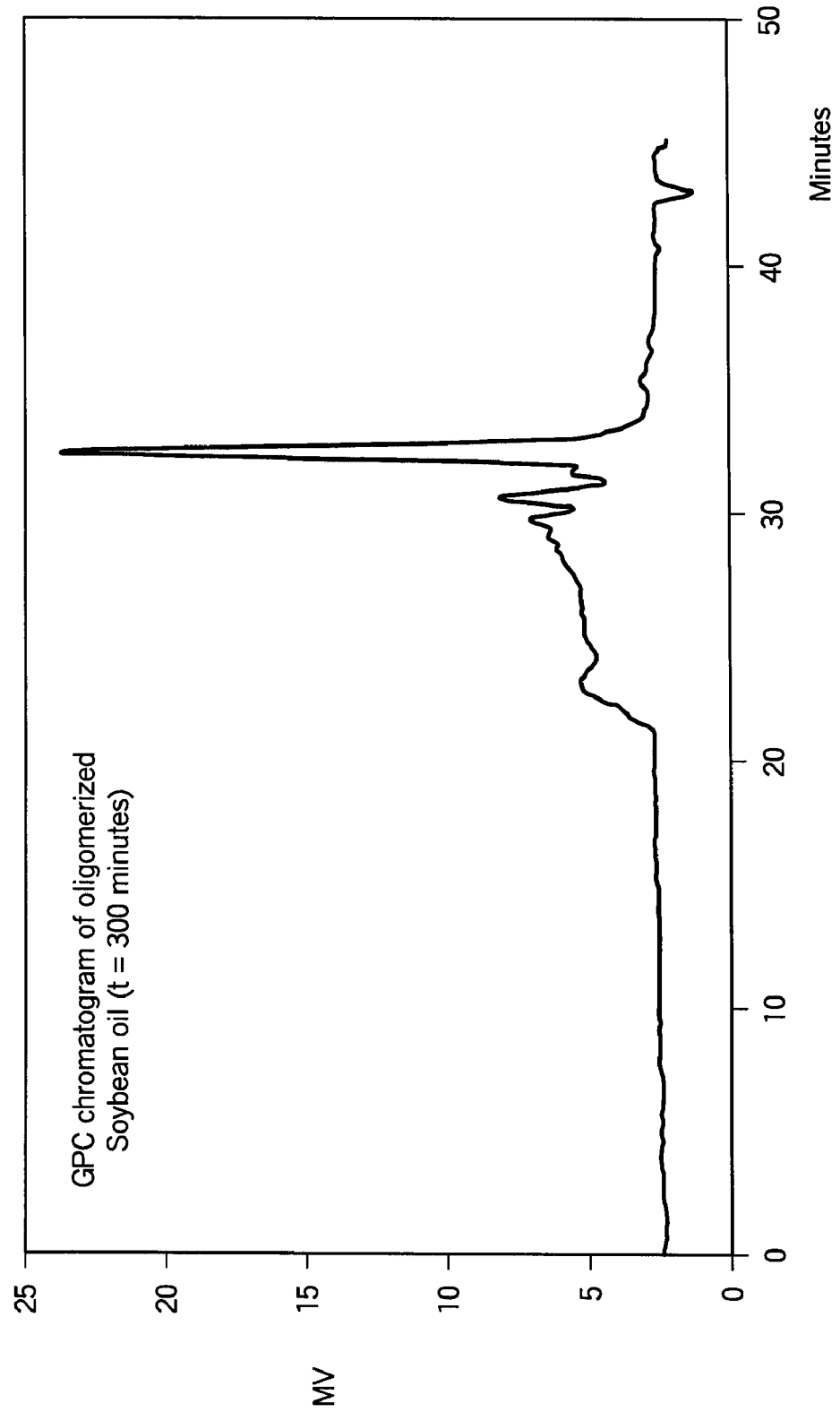

FIG. 2 displays the GPC of the reaction mass at the beginning (FIG. 2A) and after about five hours of cationic polymerization (FIG. 2B). It is observed that after five hours of the reaction, the total content of soybean oil oligomers is very high, about 60-65%, with the rest of 35-40% being the soybean oil monomer (unreacted soybean oil).

Figure 3:
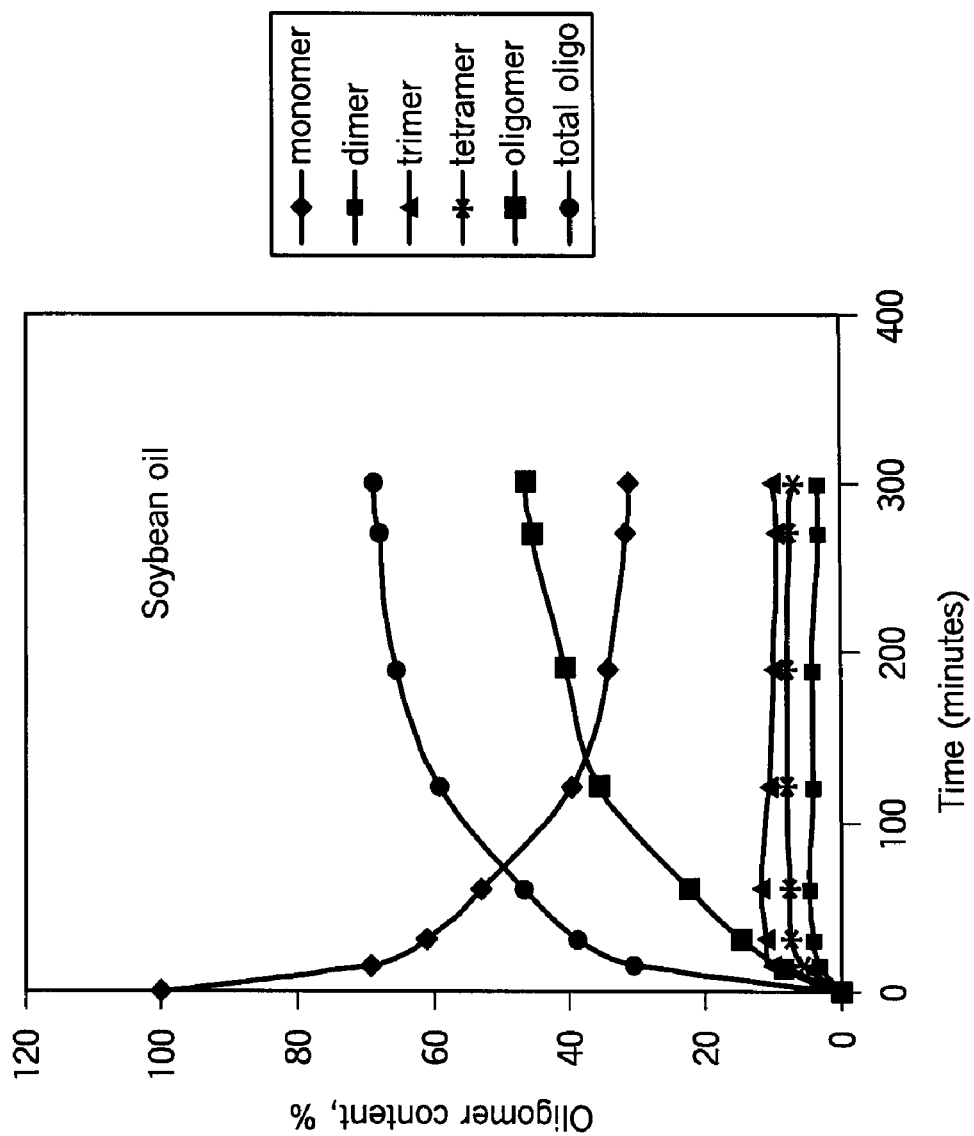
FIG. 3 shows the variation of monomer, dimer, trimer, tetramer, and other polymer content in cationic polymerization of soybean oil after about five hours of cationic polymerization. The total polymer content is about 60 to 65%.

FIG. 3 shows the composition of polymerized soybean oil during the cationic polymerization. It is observed that dimers, trimers and tetramers are present at a relatively low concentration (about 7-10%) but higher oligomers are present at about 40-42%. The total content of oligomers was about 60-65%.

Figure 4:
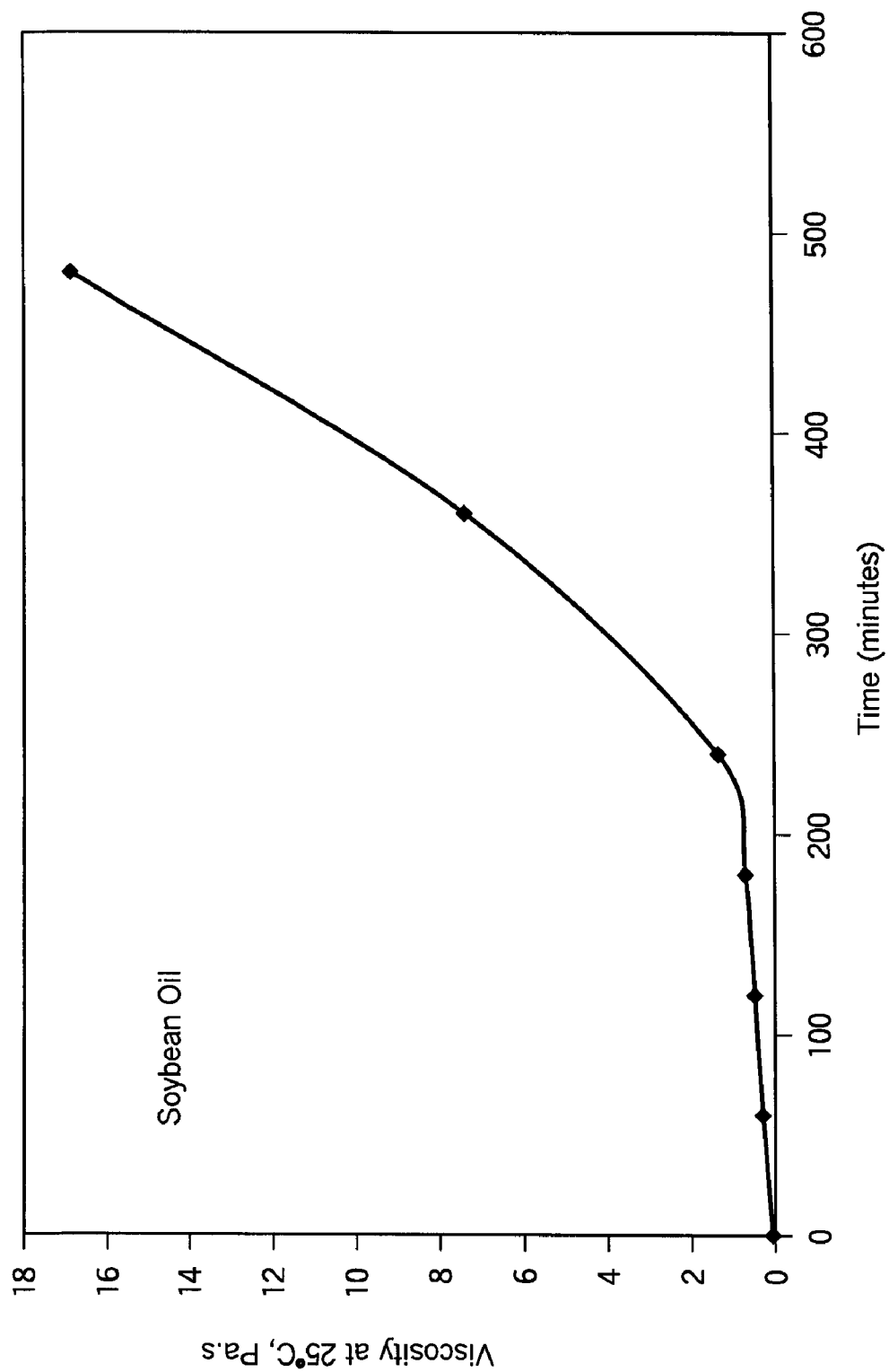
FIG. 4 shows the variation of the viscosity of the reaction mixture during cationic polymerization of soybean oil over the first 480 minutes of the polymerization reaction period.

FIG. 4 shows that the viscosity increases during the cationic polymerization of soybean oil. Briefly, the viscosity was determined at 25° C. on a Rheometrics SR-500 dynamic stress rheometer, using parallel plates of 25 mm in diameter with a gap of 0.2 mm. After about fours hours of cationic polymerization of soybean oil, the viscosity of the reaction mass was about 1.4 Pa·s at 25° C. (about 23 times higher than the initial viscosity of 0.060 Pa.s.) and after about five hours of reaction the viscosity is about 2.2 Pa·s at 25° C. (about 36 times higher than the initial viscosity).

Figure 5:
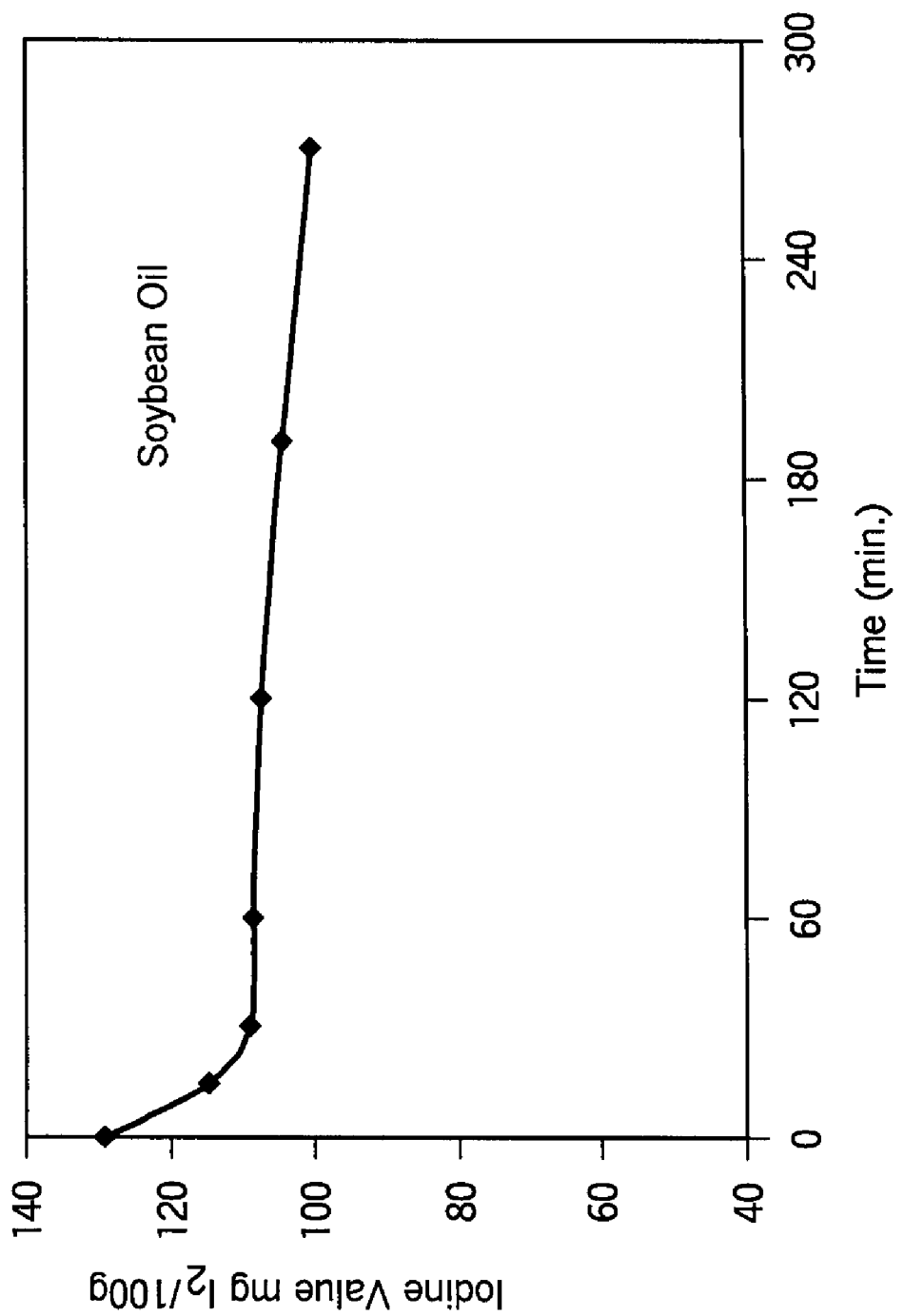
FIG. 5 shows the variation in the iodine value ("I.V.") during the cationic polymerization of soybean oil. The iodine value decreased from about 131 to about 100 g $I_2$/100 g.
Figure 6:
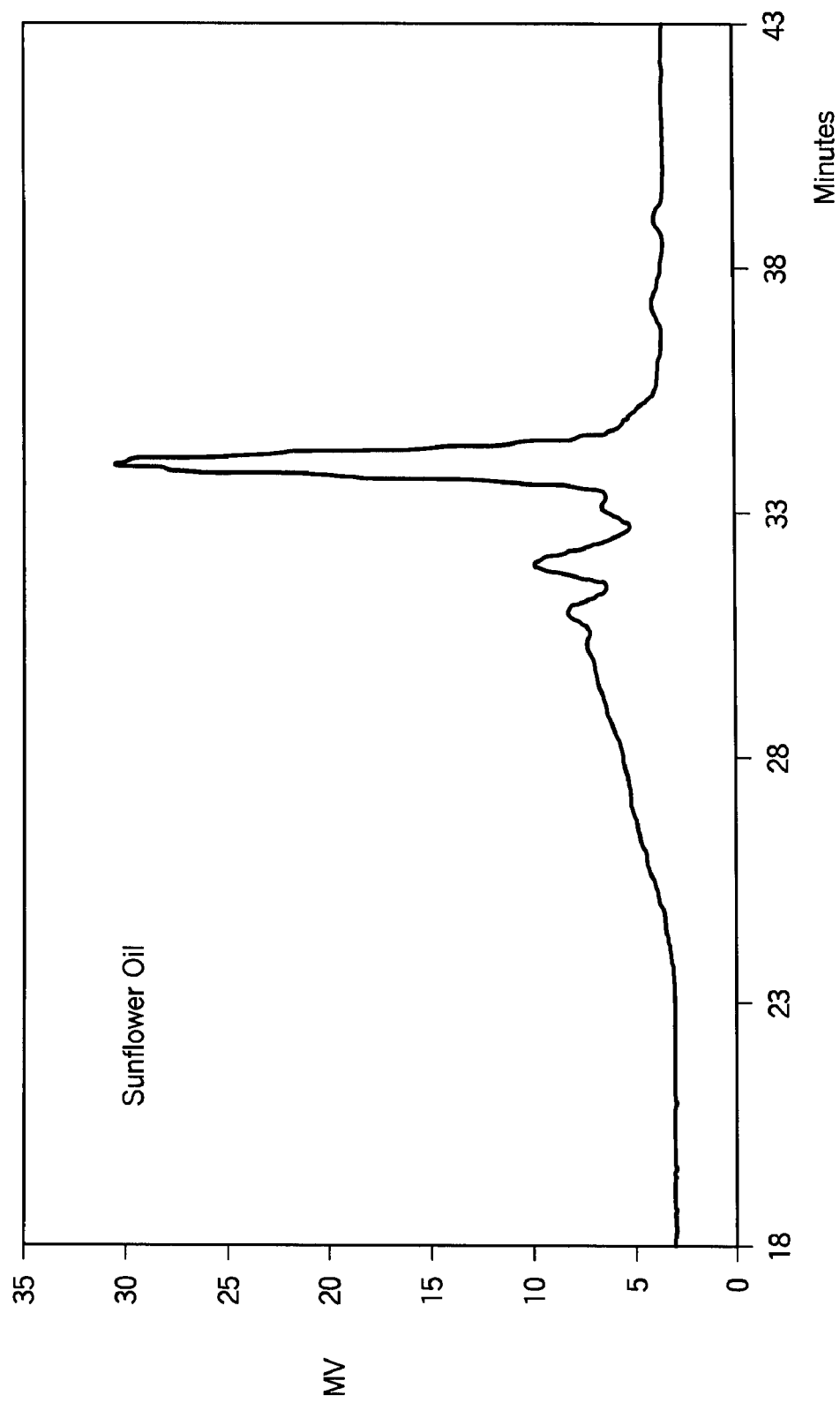
FIG. 6 shows the GPC of cationic polymerized sunflower oil (initial I.V. was about 125 g $I_2$/100 g). The polymer content after about four hours was 58.2%; the viscosity at 25° C. was 0.456 Pa·s; and the I.V. was 110 g $I_2$/100 g.
Figure 7:
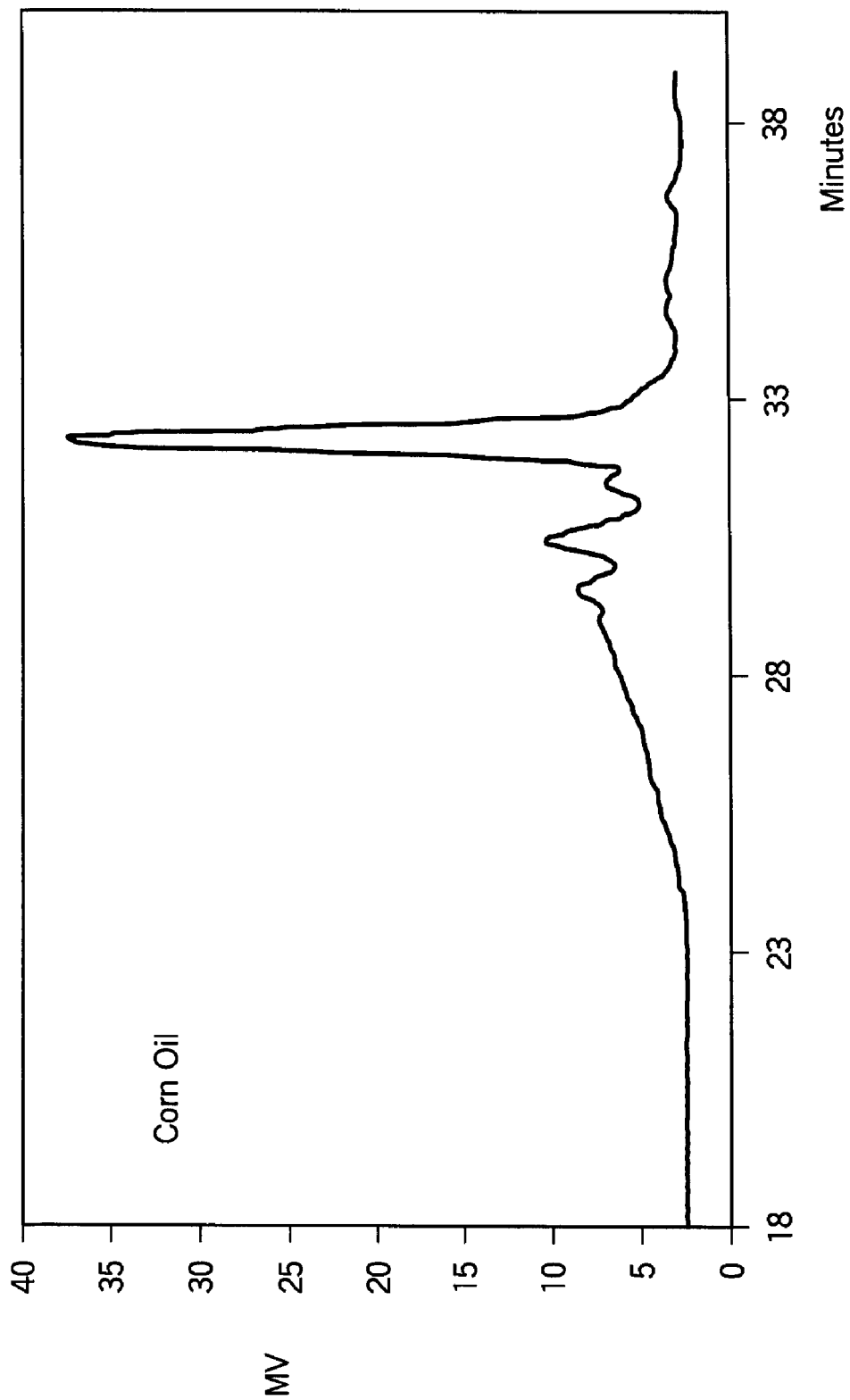
FIG. 7 shows the GPC of cationic polymerized corn oil (initial I.V. was about 125 g $I_2$/100 g). The polymer content after about four hours was 50.9%, the viscosity at 25° C. was 0.3 Pa·s.; and the I.V. was 109 g $I_2$/100 g.
Figure 8:
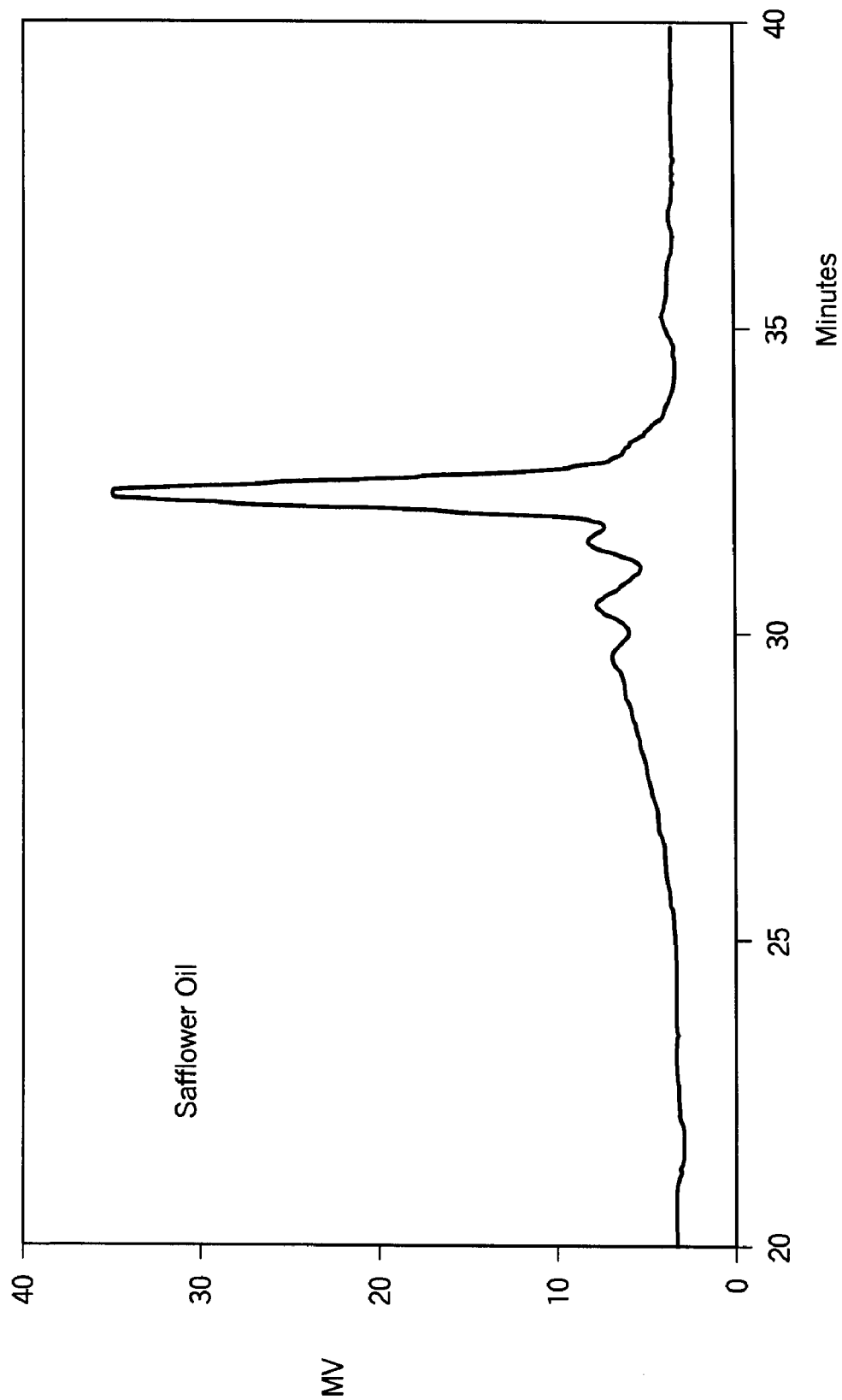
FIG. 8 shows the GPC of cationic polymerized high oleic safflower oil (81% oleic acid) (initial I.V. was about 95 g $I_2$/100 g). The polymer content after four hours was 48.2%; the viscosity at 25° C. was 0.278 Pa·s; and the I.V. was about 82 g $I_2$/100 g.
Figure 9:
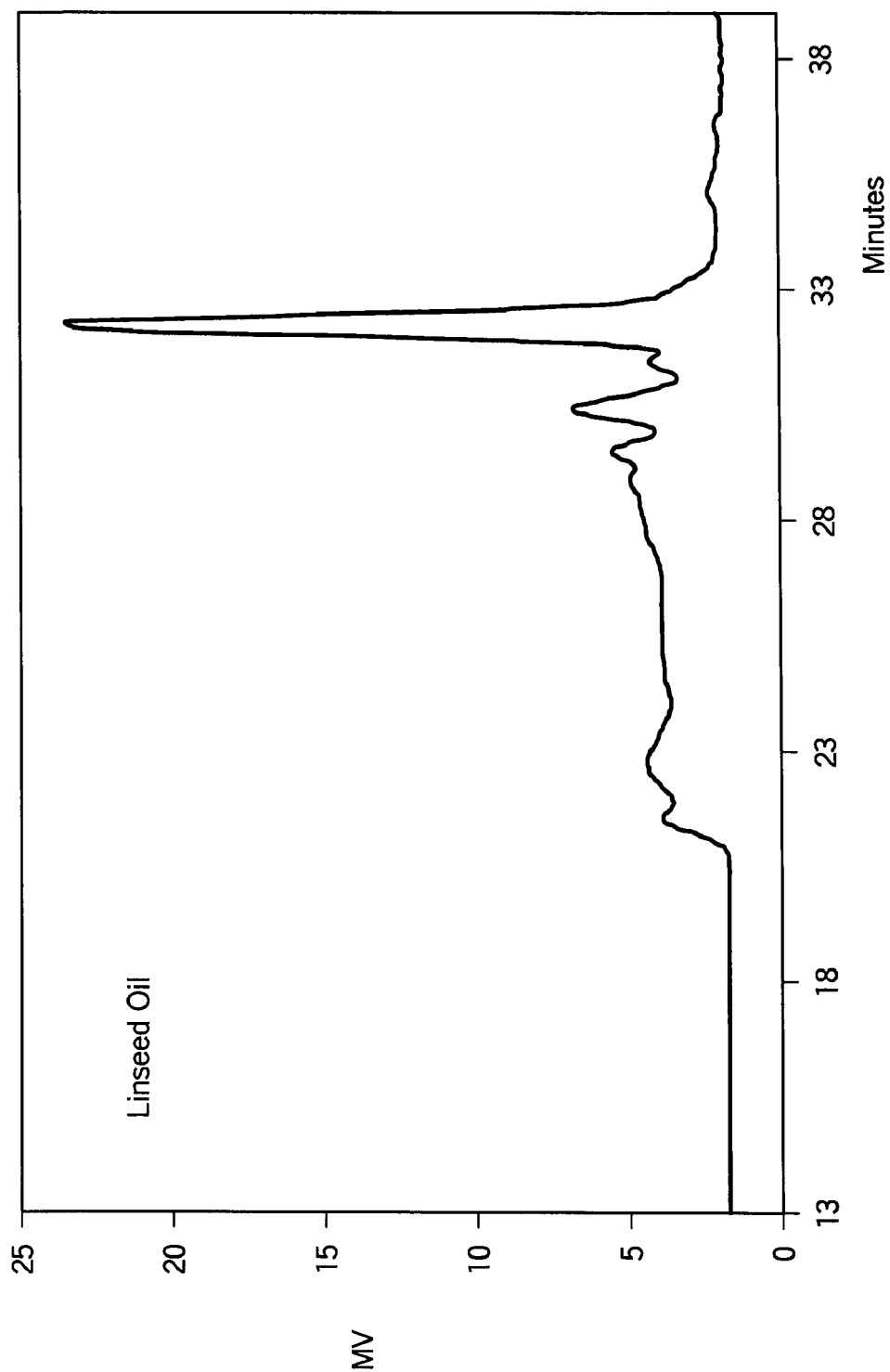
FIG. 9 shows the GPC of cationic polymerized linseed oil (initial I.V. was about 182 g $I_2$/100 g). The polymer content after about four hours was 70%; the viscosity at 25° C. was 3 Pa·s.; and the I.V. was 124 g $I_2$/100 g.

The iodine values were determined by measuring the number of grams of iodine that will react with the double bonds in 100 g of the oils according to ASTM D 1959-97. The residual degree of unsaturation in the soybean oil is relatively high during and after the polymerization process. The decrease of double bond content is only about 10-30% (FIG. 5). The initial iodine value of the soybean oil was about 127-131 g$I_2$/100 g of oil. After four hours of polymerization reaction, the I.V. was about 102 g $I_2$/100g, and after five hours of reaction, the I.V. was about 94 g $I_2$/100g. The important consequence of the reaction is that the product of soybean oil cationic polymerization has a higher molecular weight than the initial oil and at the same time relatively high unsaturation.

EXAMPLE 2

Figure 10:
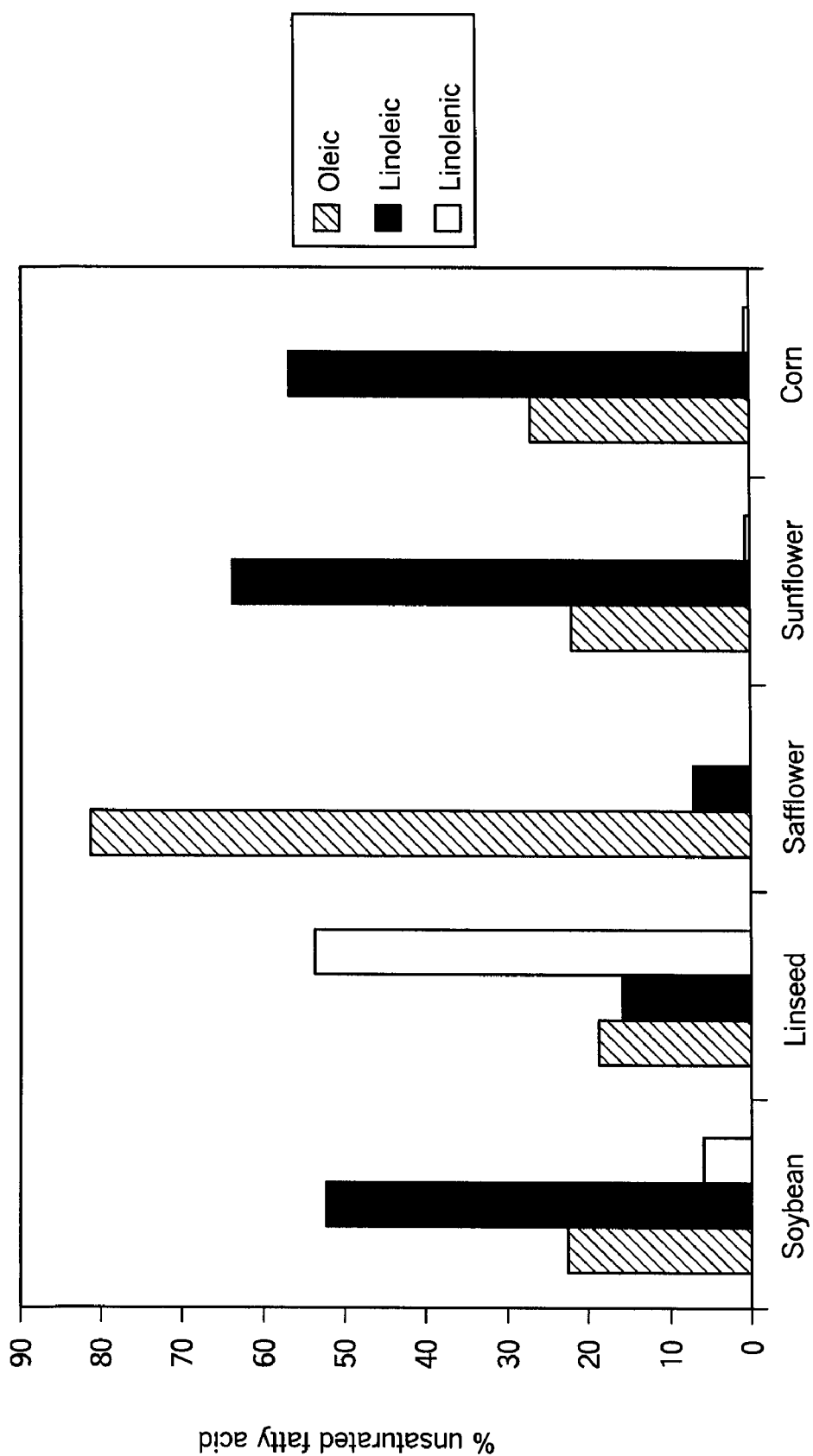
FIG. 10 shows the amount of unsaturated fatty acids of some common vegetable oils. It will be appreciated that the amounts may vary depending upon the source of the oil, and these values are representatively only.
Figure 11:
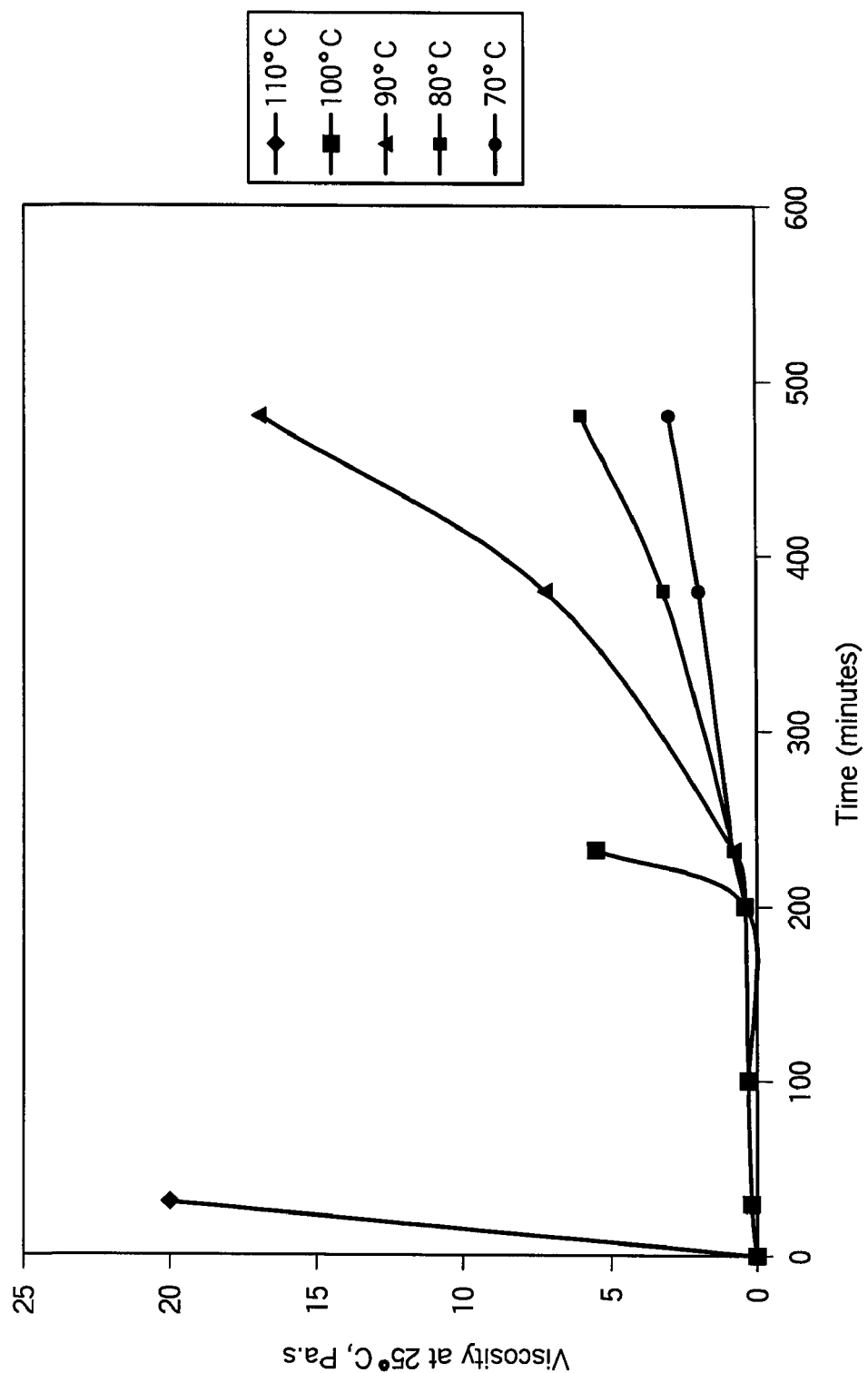
FIG. 11 shows the effect of temperature on the polymerization of soybean oil between 70 and 110° C.

Cationic Polymerization of Sunflower Oil, Safflower Oil, Corn Oil and Linseed Oil In this example, the ability of superacids to polymerize other biological oils was investigated. In general, other biological oils underwent cationic polymerization in a similar way as soybean oil, leading to formation of new molecular species having higher molecular weight than the initial oil, but with lower viscosity. In particular, FIGS. 6, 7, 8, and 9 show GPC curves of sunflower oil, corn oil, high oleic safflower oil, and linseed oil, respectively. The relative amount of oleic, linoleic, and linolenic acids in these oils are shown in FIG. 10. It will be appreciated to those skilled in the art that the fatty acid content of the biological oils may vary depending upon the source (e.g., location of production).

It is observed that in spite of relatively high polymer content, the viscosity of cationic polymerized sunflower oil, safflower oil, and corn oil is low, probably due to the low concentration of high molecular species. The lowest viscosity is in the case of high oleic safflower oil. The difference between sunflower oil, corn oil, and soybean oil is the presence in the composition of soybean oil of about 8% of linolenic acid, which is practically absent in sunflower, corn, and safflower oils. Linolenic acid has three double bonds and thus has an important contribution to increasing viscosity of polymerized oils. This effect is clearly observed in the case of linseed oil, which has higher polymer content, higher molecular weights, and higher viscosity. Next to linseed oil is soybean oil, having the second highest viscosity.

During cationic polymerization of linseed oil, the I.V. decreased from the initial I.V. of about 182 g $I_2$/100 g to about 124 g $I_2$/100 g, the polymer content was high (about 70%), and the viscosity was higher than all other cationic polymerized vegetable oils investigated. The GPC of polymerized linseed oil (FIG. 9) suggests that very high molecular weight polymers are formed. Linseed oil (having about 52% of linolenic acid) gives the highest viscosity. Safflower oil, sunflower oil, and corn oil, having a similar unsaturation as soybean oil give low viscosity cationic polymerized oils because of a very low content of linolenic acid (about 0.3-0.6%). Probably, highly functional linolenic acid has an important contribution in molecular weight increase of the biological oils. Fish oil, which has a very high unsaturation, comparable or higher than that of linseed oil, is expected to give also high viscosity products of cationic polymerization. The high content of highly unsaturated omega-3 $C_{20}$ and $C_{22}$ fatty acids of fish oil, having about 4-6 double bonds/mol of fatty acid, would lead to a highest viscosity and molecular weight of cationically polymerized fish oil.

EXAMPLE 3

Cationic Polymerization of Tung Oil

Tung oil is a biological oil containing unsaturated fatty acids with conjugated double bonds. Tung oil has 75-85% of alpha-eleostearic acid, an isomer of linolenic acid, having the three double bonds in a conjugated triene structure. The double bonds are 9-cis, 11-trans, and 13-trans. The I.V. of tung oil is about 168-170 g $I_2$/100 g.

Cationic polymerization of tung oil in the presence of a superacid such as $HBF_4$, at 90° C., was rapid violent, giving in less than ten minutes a cross-linked polymeric solid powder of dark red-brown color. The conjugated double bonds are much more reactive in cationic polymerization than the double bonds of some other vegetable oils or fish oil having allylic and bis-allylic structure. In this group of conjugated oils, with potential high reactivity in cationic polymerization are oiticica oil (18:3, about 75-80% fatty acids with conjugated double bonds), dehydrated castor oil (18:2, 90% fatty acids with conjugated unsaturation), and calendula oil (18:3, with about 55% fatty acids with conjugated unsaturation).

EXAMPLE 4

Effect of Temperature

In this example, the polymerization rate of soybean oil was investigated as a function of temperature using 1% $HBF_4$ as the superacid catalyst. It was shown that temperature is an important factor in the polymerization rate. Such higher temperatures yielded higher reaction rates. As shown in FIG. 1, a polymerized oil having a viscosity of 8 Pa·s is produced at 120° C. in about 30 minutes while the same viscosity is obtained after about 400 minutes at 90° C. The preferred reaction rate is obtained at about 90° C. and 1% of tetrafluoroboric acid, producing a polymeric oil of viscosity 8-10 Pa·s in about six hours.

It has been found that when the catalyst is added at higher temperature, the cationic polymerization generates solid particles (gels) resulting in the cloudy product. However, when the catalyst is added at room temperature and the mixture stirred until the solution becomes dark brown for about one hour, indicating formation of carbocation centers, and then the temperature raised to 90-100° C., the resulting product is clear.

More specifically, when $HBF_4$ is introduced to the reaction mixture at 90° C., the reaction mass becomes suddenly dark brown, and some solid particles are formed. Because the soybean oil is a polyfunctional compound (have 4.5-4.6 double bonds/mol), crosslinking rapidly occurs. The filtered solid formed (less than 1%), which are unsoluble (all the cross-linked polymers are unsoluble). In contrast, when the catalyst is added at or near room temperature, the dark brown color characteristic to conjugated cations is formed in about 20 minutes and by heating at the temperature of reaction of 90° C., no solid polymers are formed in about six hours of reaction. If the polymerization is continued for a longer time (e.g., about 7-10 hours), the appearance of solid cross-linked polymers is observed, and finally the reaction mass become an elastic cross-linked solid. Generally, the reaction is terminated after about 5-6 hours in order to obtain a viscous liquid useful for many applications. If a solid is desired, for example for rubber modification by creating analogue of factice (or Faktis), the reaction is terminated after about 8-10 hours.

EXAMPLE 5

Effect of Catalyst Concentration

Figure 12:
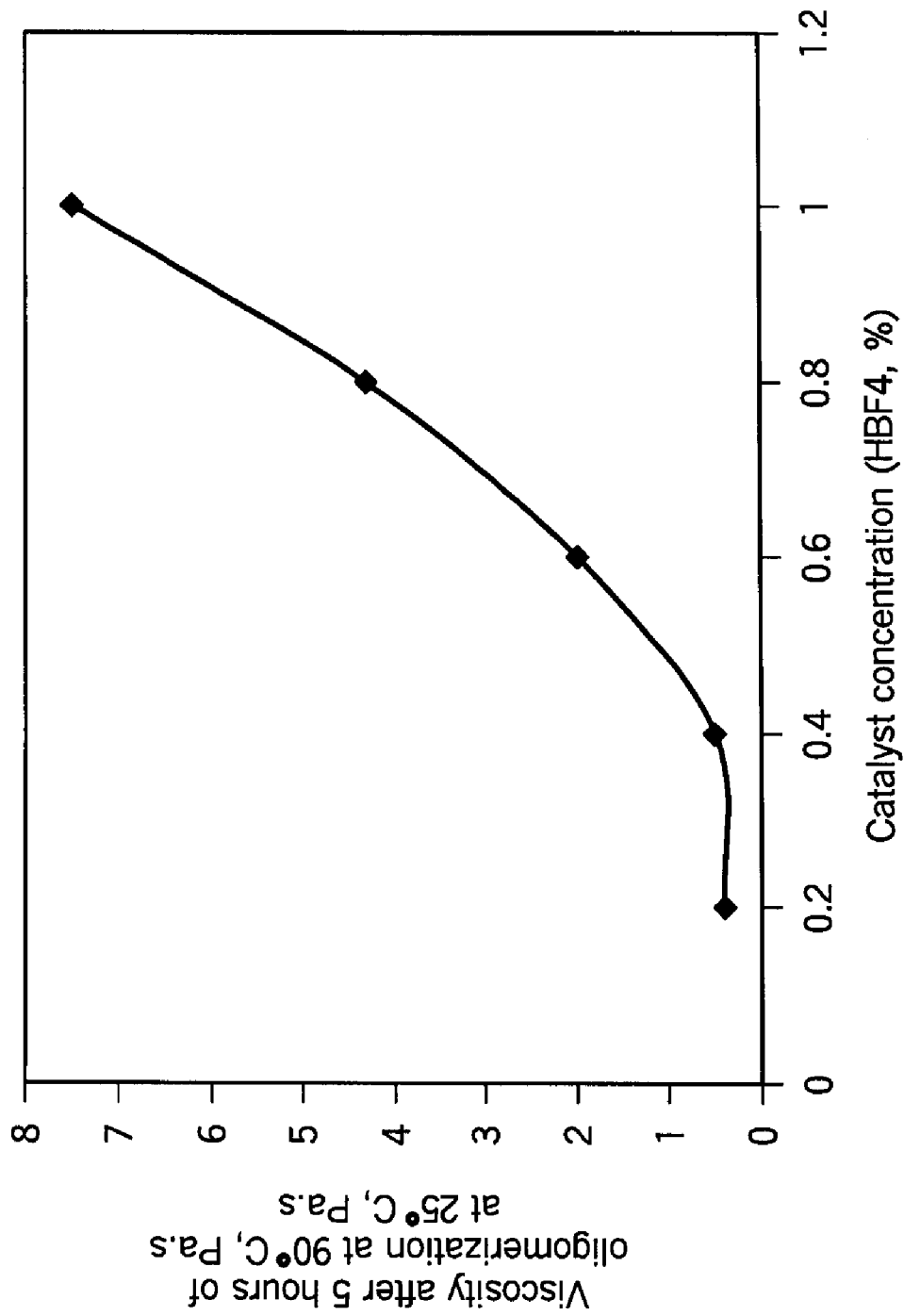
FIG. 12 shows the effect of $HBF_4$ catalyst concentration on the polymerization of soybean oil.

In this example, the polymerization rate of soybean oil at 90° C. was investigated as a function of the catalyst concentration. Varying amounts of tetrafluoroboric acid ($HBF_4$) in an ether solution were tested, and the viscosity was measured about five hours after initiation of the polymerization reaction. As shown in FIG. 12, the catalyst concentration of about 1% $HBF_4$ provides a suitable polymerization rate even at relatively mild temperatures, with an $HBF_4$ concentration as low as 0.4 wt. % for acceptable rates of reaction. Higher concentrations of the tetrafluoroboric acid than 1% give extremely high rates, but also may cause splitting of ester bonds in triglycerides.

EXAMPLE 6

Effect of Catalyst Nature

Figure 13:
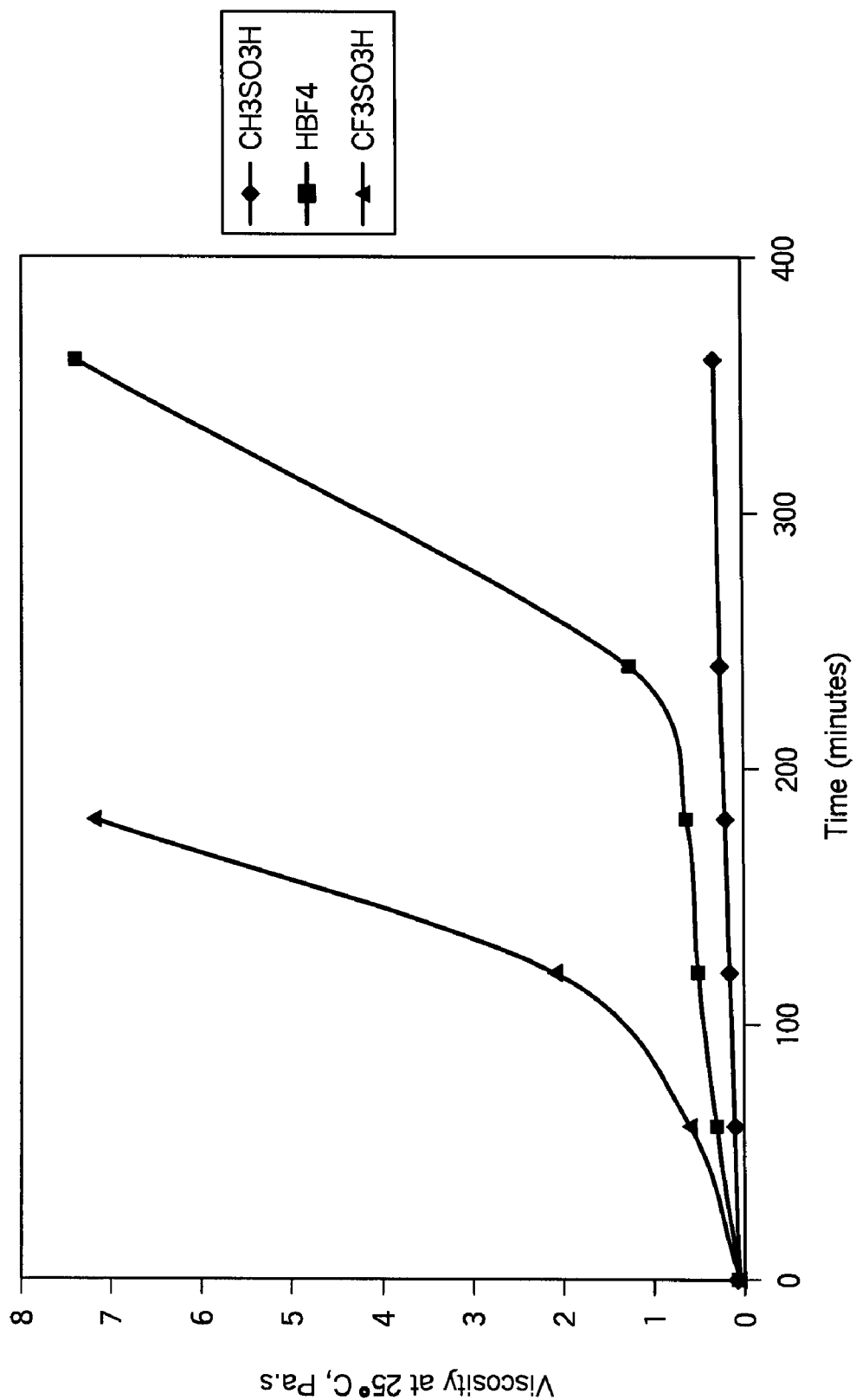
FIG. 13 shows polymerization of soybean oil using three different superacids.

In this example, various acids were investigated to compare the catalytic abilities to polymerize soybean oil. All acids were used in pure form at equimolar concentration (0.0114 mols at 100 g of oil), at 90° C. under nitrogen. The most efficient catalysts were the superacids: triflic acid ($CF_3SO_3H$), hexafluoroantimonic acid ($HSbF_6$), and tetrafluoroboric acid ($HBF_4$). The viscosity of the polymerized products is shown in FIG. 13.

Several acids with acidity comparable with those of 100% $H_2SO_4$ were relatively inactive in polymerization reaction, including sulfuric acid ($H_2SO_4$; $pK_a$ of about −3), methane sulfonic acid ($CH_3SO_3H$; $pK_a$ of about −2.6, see FIG. 13), and p-toluene sulfonic acid ($CH_3C_6H_4SO_3H$; $pK_a$ of about −2.8. After six hours of polymerization, the reaction product essentially contains soybean oil monomers with insignificant traces of low oligomers.

In addition, it was found that chlorosulfonic acid ($ClSO_3H$) and fluorosulfuric acid ($HFSO_3$) were not catalytically active, most likely because the bond sulfur-halogen (S—F or S—Cl) are added to the double bonds of oils, with formation of alkylsulfonic acids, of low acidity, with no catalytic efficiency. When these catalysts were used, a violent reaction began with the formation of solids and suddenly the reaction stopped, probably by the addition of sulfur-halogen bonds to double bonds of oils. In addition, some heteropolyacids (tungstosilicic acid, molybdeno-phosphoric acid, silicomolybdic acid, etc.) complex acids, with an acidity a little higher than $H_2SO_4$, had a very low or no catalytic activity. They are delivered only as hydrates and probably water is a strong inhibitor of the reaction. In addition, perchloric acid ($HClO_4$), which is generally delivered as 70% aqueous solution, was very difficult to obtain it in the pure form because it is explosive. Water is an inhibitor of cationic polymerization because it destroys the carbocations involved in the cationic polymerization.

Thus, in general, this example illustrated that improved cationic polymerization of biological oils was achieved using superacids in pure form or as solutions in non-protic solvents. Aqueous solutions or alcoholic solutions of superacids, regardless of the acid strength had no catalytic effect.

EXAMPLE 7

Co-polymerization of Various Biological Oils

This example investigated whether it was possible to copolymerize different biological oils. More specifically, this example demonstrated that biological oils having low reactivity in homopolymerization reactions could be transformed into highly reactive oils by copolymerization with other biological oils having high degrees of unsaturated fatty acids (e.g., linseed oil). Thus, this example demonstrates that is possible to improve the cationic polymerization of soybean oil by copolymerization with linseed oil in order to obtain polymerized oils of higher viscosity in a shorter period of time compared to the cationic homopolymerization of soybean oil.

In this example, exemplary mixtures of oils included 80% soybean oil and 20% linseed oil; 80% sunflower oil and 20% linseed oil; 80% corn oil and 20% linseed oil; 80% canola oil and 20% linseed oil; 90% soybean oil and 10% tung oil. All percentages are on a weight basis.

Figure 14:
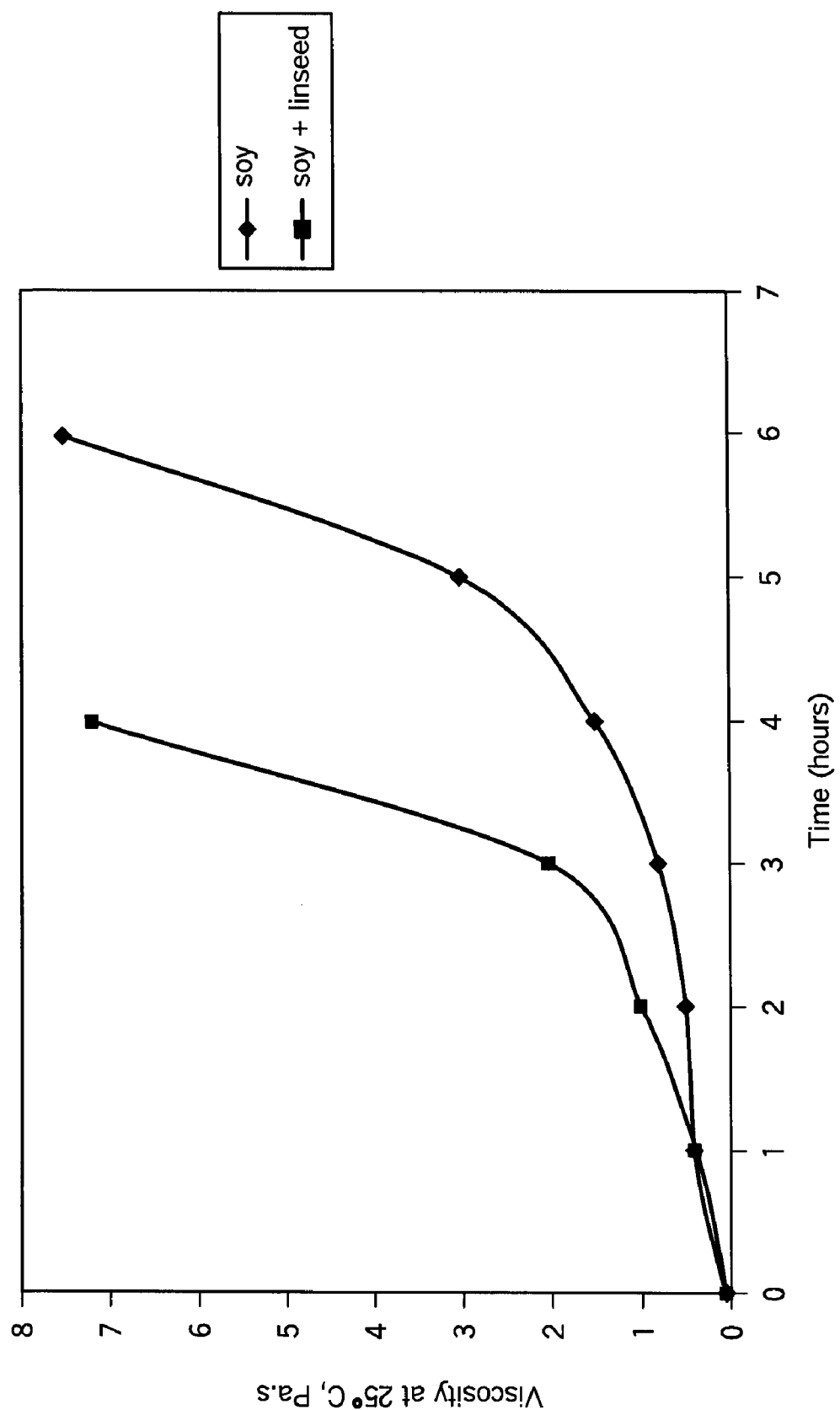
FIG. 14 compares the viscosity changes during the polymerization of soybean oil and a mixture of soybean oil (80%) and linseed oil (20%).
Figure 15:
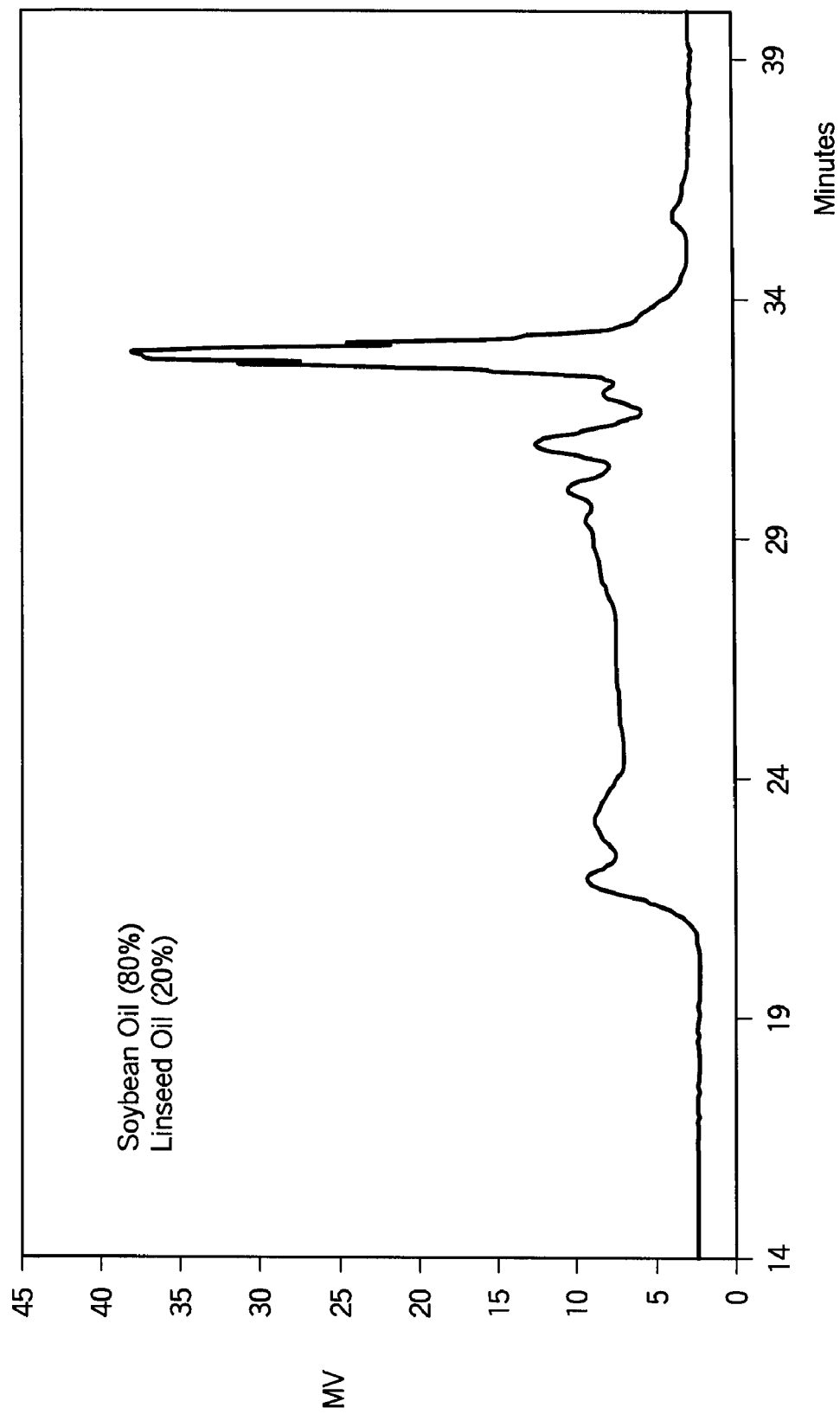
FIG. 15 is a GPC comparing the polymerization of soybean oil (6 hours), polymerized soybean oil (8 hours), and co-polymerized soybean oil (80%), and linseed oil (20%).

FIG. 14 shows the viscosity as a function of time during the co-polymerization of a mixture of soybean oil (80%) and linseed oil (20%) and polymerization of soybean oil alone. The polymerization reaction was performed as before using tetrafluoroboric acid (1% diethyl ether) as a catalyst at 90° C. Clearly, the addition of the linseed oil increased the polymerization reaction rate as measured by the viscosity as a function of time. FIG. 15 shows that the polymer content of the mixture was about 70% after about 3.5 hours, which is somewhat higher that soybean oil alone (FIG. 3).

Figure 16:
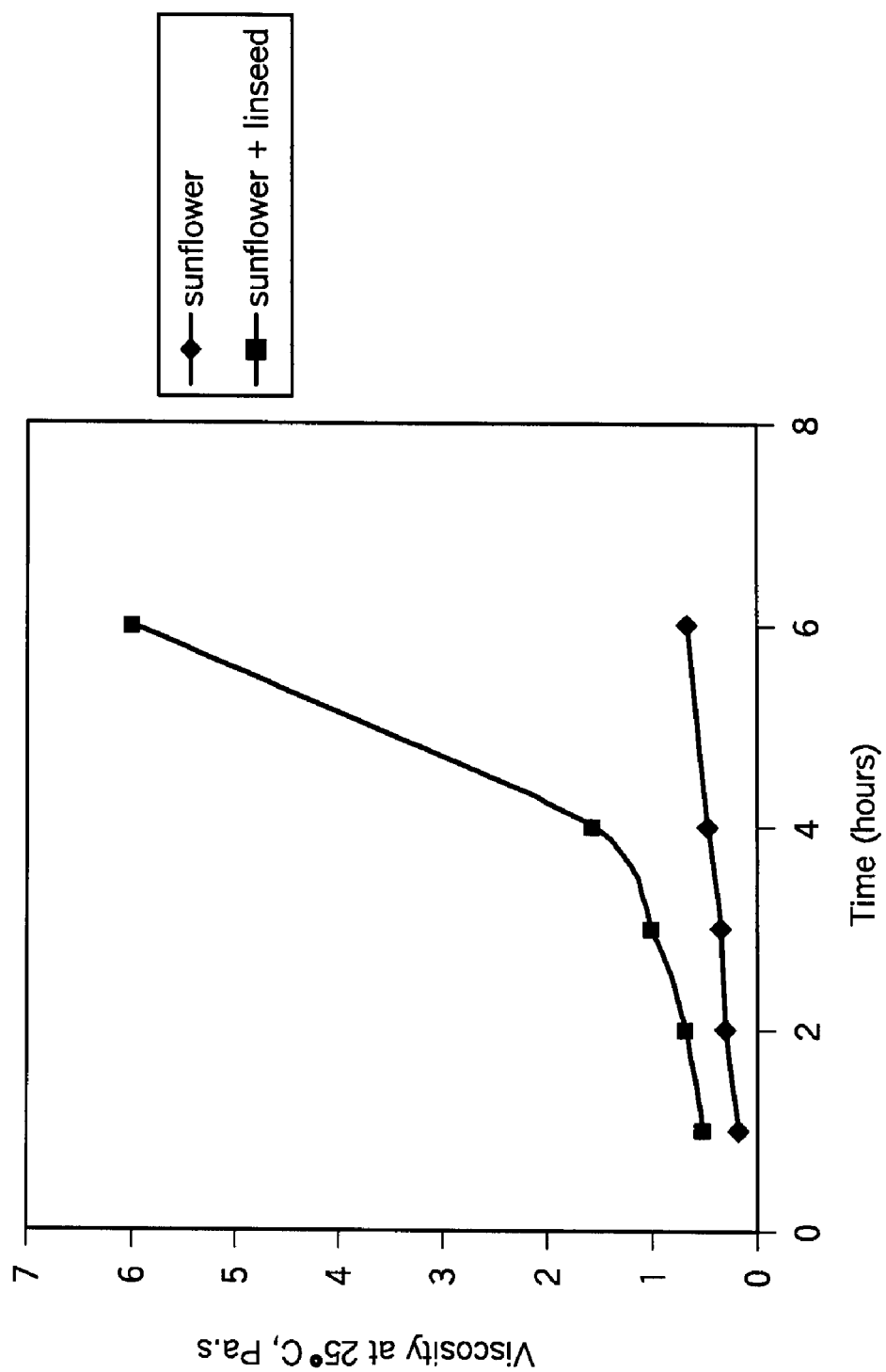
FIG. 16 compares the viscosity changes during the polymerization of sunflower oil compared to a mixture of sunflower oil (80%) and linseed oil (20%).
Figure 17:
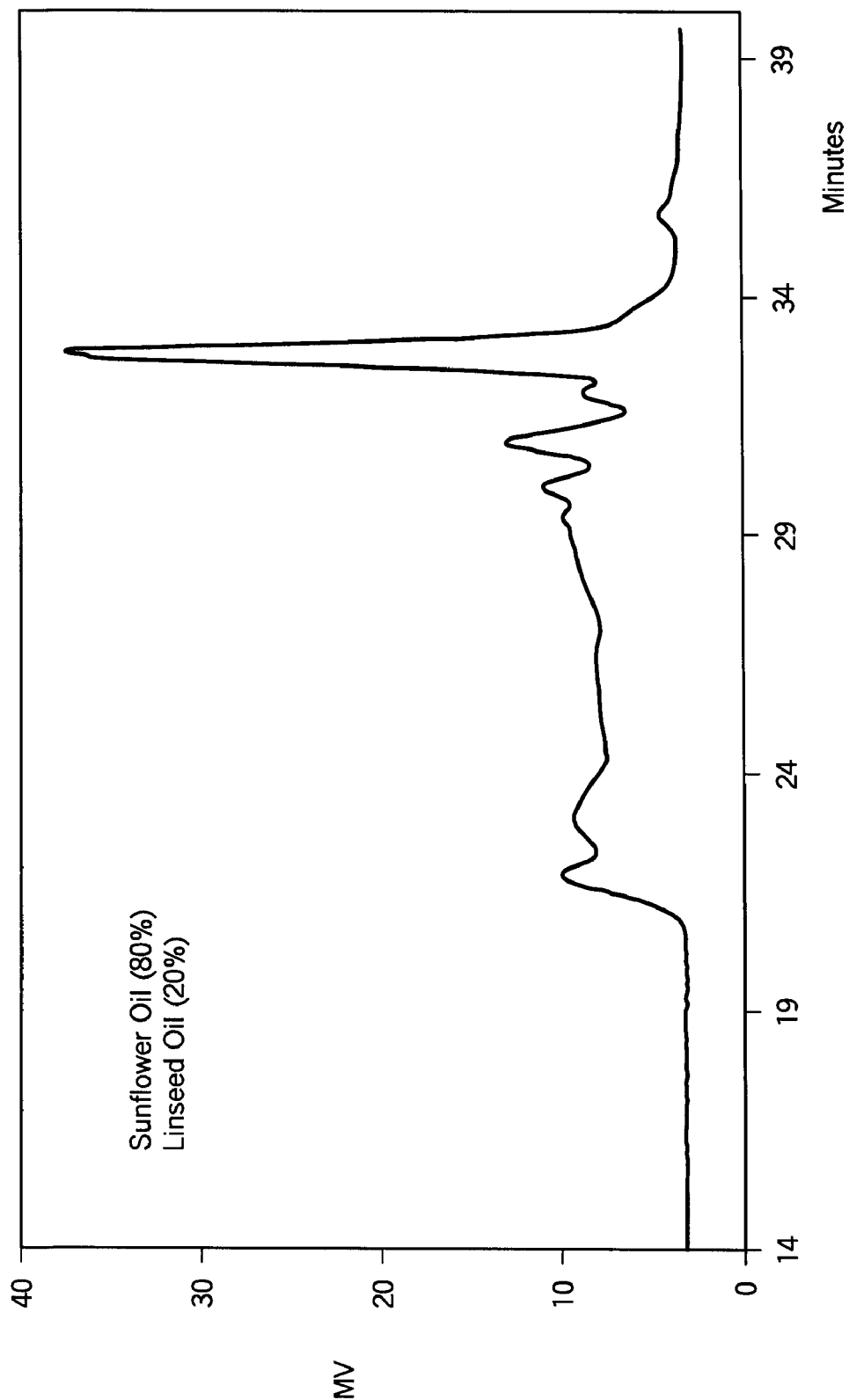
FIG. 17 is a GPC of co-polymerized soybean oil (80%) and linseed oil (20%).

FIG. 16 shows the viscosity as a function of time during the co-polymerization of a mixture of sunflower oil (80%) and linseed oil (20%) and polymerization of sunflower oil alone. The polymerization reaction was performed as before using tetrafluoroboric acid (1%) as a catalyst at 90° C. Clearly, the addition of the linseed oil increased the polymerization reaction rate as measured by the viscosity as a function of time. The polymer content of the sunflower/linseed oil mixture was about 73% after about 3.5 hours, the viscosity was about 6 Pa·s, and the I.V. was about 102 g $I_2$/100 g. Thus, the polymer content and viscosity increased substantially compared to soybean oil alone (FIG. 6, polymer content of 58%, viscosity of 0.456 Pa·s (four hours), and I.V. of about 110 g $I_2$/100 g). The GPC of the polymerized sunflower/linseed mixture is shown in FIG. 17.

Figure 18:
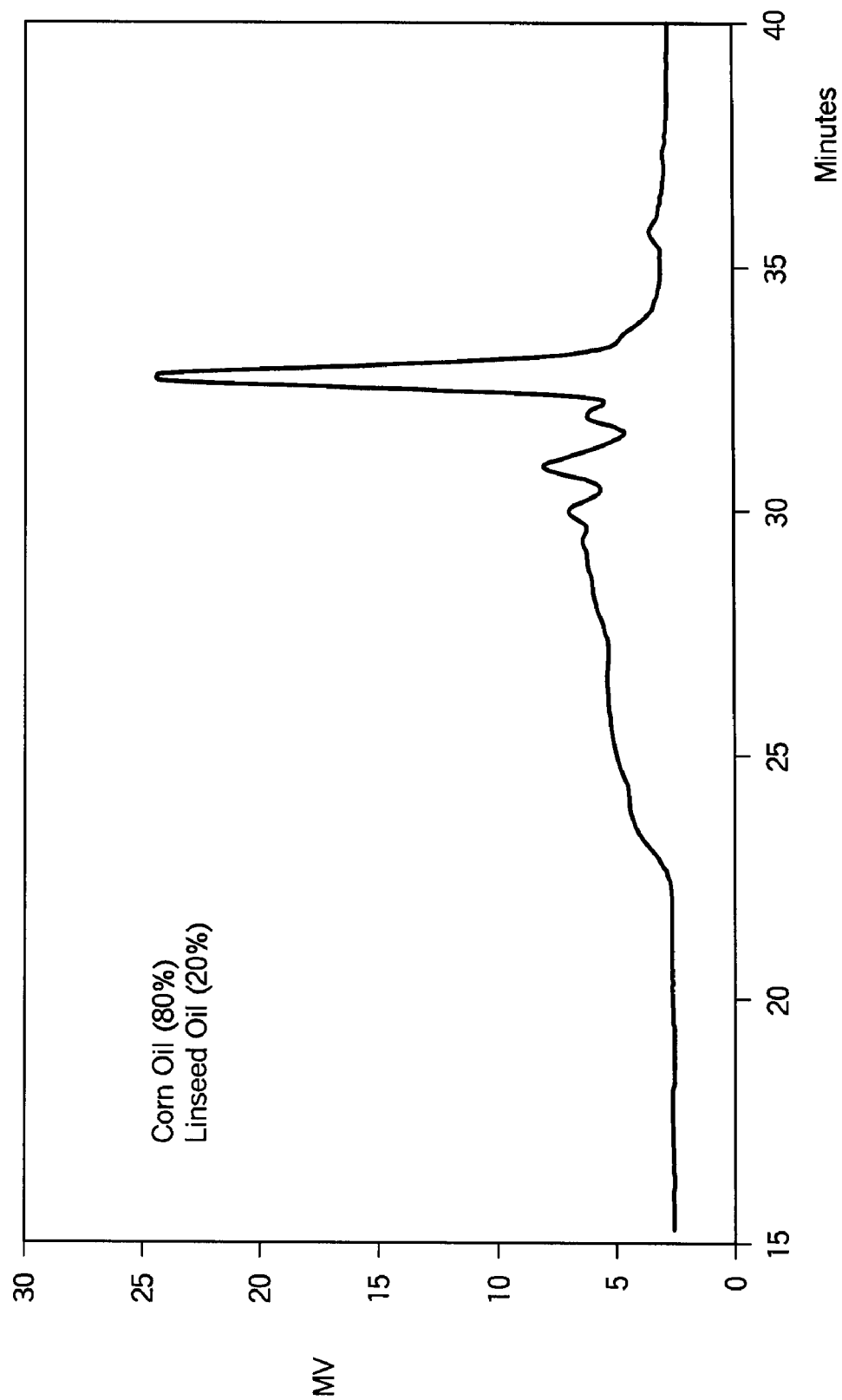
FIG. 18 is a GPC of co-polymerized corn oil (80%) and linseed oil (20%).

FIG. 18 is a GPC of a mixture of corn oil (80%) and linseed oil (20%). The polymerization reaction was performed as before using tetrafluoroboric acid (1%) as a catalyst at 90° C. The polymer content of the corn/linseed oil mixture was about 66% after about five hours, the viscosity was about 1.0 Pa·s, and the I.V. was about 98 g $I_2$/100 g. Thus, the polymer content and viscosity of the corn/linseed oil mixture increased substantially compared to soybean oil alone (FIG. 7, polymer content of 51%, viscosity of 0.2 Pa·s (four hours), and I.V. of about 109 g $I_2$/100 g).

Figure 19:
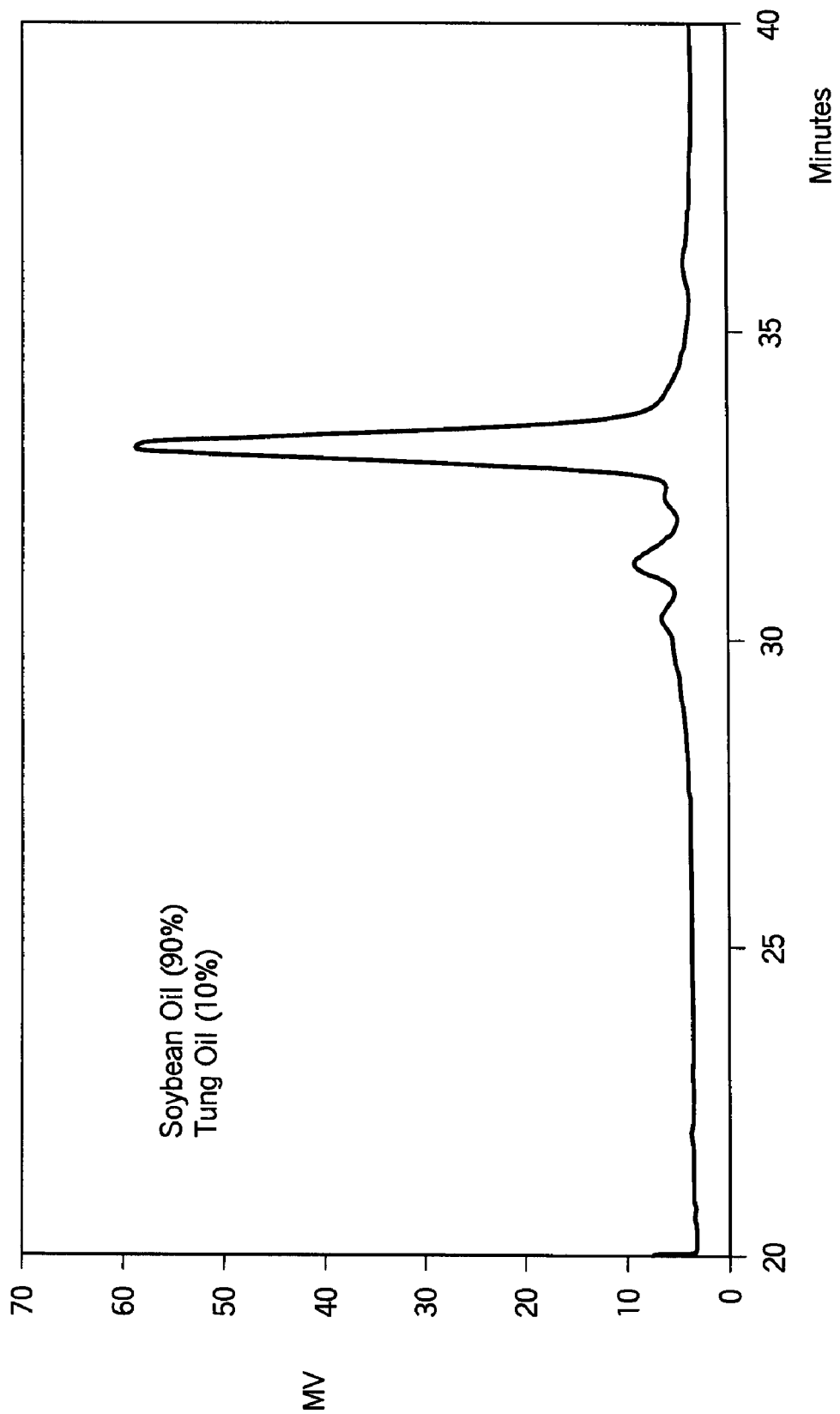
FIG. 19 is a GPC of co-polymerized soybean oil (90%) and tung oil (10%).

FIG. 19 is a GPC of a mixture of soybean oil (90%) and tung oil (10%). The polymerization reaction was performed as before using tetrafluoroboric acid (1%) as a catalyst at 90° C. The polymer content of the corn/linseed oil mixture was about 20% after about five hours, the viscosity was about 1.5 Pa·s, and the I.V. was about 105 g $I_2$/100 g.

Thus, the foregoing experiments show that cationic copolymerization of biological oils is a simple and convenient way to transform low reactivity biological oils in homopolymerization (e.g., sunflower, corn, canola oils) into more reactive oils by copolymerization with oils having very high unsaturation and high content in polyunsaturated fatty acids, especially those having 3-6 double bonds (e.g., linoleic acids). Further, by co-polymerization of soybean oil with linseed oil, a substantial shortening of the time needed to obtain high viscosity polymers occurs.

EXAMPLE 8

Polymerized Oils Purification

In the foregoing examples, the acid catalyst may be removed from the polymerized oil by simple treatment with basic substances, preferably hydroxides and carbonates. Exemplary bases include CaO, $Ca(OH)_2$, $CaCO_3$, $NaHCO_3$, $Na_2CO_2$, hydrotalcite, $Mg(OH)_2$, etc. The preferred neutralizing agent is $Ca(OH)_2$. The resulting solids were removed from the polymerized oils by filtration under moderate pressure (about 40-60 psi) at moderate temperatures (about 60-100° C.), more preferably about 50-60° C. Vacuum distillation was used to remove traces of volatile compounds (e.g., diethyl ether from the catalysts and water resulting from neutralization).

From the foregoing, it will be seen that this invention is one well adapted to attain all ends and objectives herein-above set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombina-

What is claimed and desired to be secured by Letters Patent is as follows:

1. A method for polymerizing a biological oil comprising
obtaining at least one biological oil containing an unsaturated fatty acid ester;
mixing the biological oil with a superacid catalyst having a $pK_a$ between about −3 and −25 to form an oil-catalyst reaction mixture; and
maintaining the oil-catalyst reaction mixture at a temperature less than about 110° C. for a reaction period to form a polymerized biological oil.

2. The method of claim 1 wherein said superacid catalyst is selected from the group consisting of tetrafluoroboric acid ($HBF_4$), triflic acid ($CF_3SO_3H$), and hexafluoroantimonic acid ($HSbF_6$).

3. The method of claim 1 wherein said superacid catalyst is selected from the group consisting of hexafluorophosphoric acid ($HPF_6$), hexafluoroarsenic acid ($HAsF_6$), hexafluorotantalum acid ($HTaF_6$), hexafluoroniobium acid ($HNbF_6$), $HCB_{10}Cl_{11}$, and anhydrous hydrofluoric acid (HF).

4. The method of claim 1 wherein said superacid catalyst is defined according to the formula $CF_3$—$(CF_2)_x$—$SO_3H$, wherein x is an integer between 1-20.

5. The method of claim 1 wherein said superacid catalyst has a $pK_a$ between about −10 and −25.

6. The method of claim 1 wherein said oil-catalyst reaction mixture is maintained at about 20 to 35° C. for about 20 to 120 minutes, and then heating the reaction mixture to about 80 to 110° C. for about 3 to 10 hours.

7. The method of claim 1 wherein said biological oil is selected from the group consisting of corn, canola, coconut, fish, linseed, olive, palm, peanut, tung, rapeseed, safflower, sesame, soybean, sunflower, and walnut oils, or mixtures thereof.

8. The method of claim 7 wherein said mixture of biological oils comprises at least one biological oil with a linolenic acid content of at least 30%.

9. The method of claim 8 wherein said biological oil with a linolenic acid content of at least 30% is linseed oil.

10. The method of claim 1 wherein said biological oil is fish oil or whale oil, or mixtures thereof.

11. The method of claim 1 wherein said temperature is from about 80 to about 100° C.

12. The method of claim 1 wherein said reaction period is between about one hour and six hours.

13. The method of claim 1 wherein said reaction mixture consists essentially of biological oils and said superacid catalyst.

14. The method of claim 1 further comprising the step of mixing said biological oil with at least one comonomer.

15. The method of claim 14 wherein said at least one comonomer is selected from the group consisting of isobutylene, p-methoxy-styrene, vinyl toluene, vinyl naphthalene, ethyl vinyl ether, iso-butyl vinyl ether, triethylene glycol divinyl ether, diethylene glycol divinyl ether, butylene glycol divinyl ether, isopropyl vinyl ether, vinyl carbazole, styrene, divinylbenzene, diisopropenylbenzene, norbornene, dicyclopentadiene, alpha-methylstyrene, isoprene, myrcene, 1,1-dichloroethene, linalool, cyclopentadiene, 1,3-di-(2-propenyl)benzene, dipentene, 1,1-diphenylethene, 2,5-dimethylhexa-2,5-diene, ethyl-2-carboethoxy-3-methyl-2-butenoate, ethylvinyl ether, 4-vinyl cyclohexene, diallyl terephthalate, furan, p-benzoquinone, and p-mentha-1,8-diene.

16. The method of claim 14 wherein said at least one comonomer is added in an amount in the range of about 5% to about 35% by weight of said reaction mixture.

17. The method of claim 1 wherein said polymerized biological oil has a polymer content greater than about 50%.

18. The method of claim 1 wherein said polymerized biological oil has a viscosity which is 10 to 200 times greater than said biological oil.

19. The method of claim 1 wherein said polymerized biological oil has a viscosity which is 10 to 40 times greater than said biological oil.

20. The method of claim 1 wherein said polymerized biological oil has an iodine value which is about 10 to 30% lower than an iodine value of said biological oil.

21. The method of claim 1 further comprising the step of neutralizing said superacid catalyst with a base.

22. The method of claim 21 wherein said base is selected from the group consisting of calcium hydroxide, calcium oxide, calcium carbonate, sodium bicarbonate, sodium carbonate, magnesium hydroxide, and hydrotalcite.

* * * * *